United States Patent
Mendell et al.

(10) Patent No.: US 12,430,696 B2
(45) Date of Patent: Sep. 30, 2025

(54) SYSTEMS AND METHODS FOR SYNCHRONIZING EVENT DATA STRUCTURES IN COMPUTER NETWORKS

(71) Applicant: DK Crown Holdings Inc., Boston, MA (US)

(72) Inventors: Jordan Mendell, Boca Raton, FL (US); Christopher Haralampoudis, Venice, CA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/589,213

(22) Filed: Feb. 27, 2024

(65) Prior Publication Data

US 2025/0274508 A1    Aug. 28, 2025

Related U.S. Application Data

(63) Continuation of application No. 17/971,050, filed on Oct. 21, 2022, now abandoned.

(51) Int. Cl.
*H04L 67/1095* (2022.01)
*A63F 13/79* (2014.01)
*A63F 13/85* (2014.01)

(52) U.S. Cl.
CPC .......... *H04L 67/1095* (2013.01); *A63F 13/79* (2014.09); *A63F 13/85* (2014.09)

(58) Field of Classification Search
CPC .................................................. H04L 67/1095
See application file for complete search history.

(56) References Cited

U.S. PATENT DOCUMENTS

| 2008/0220856 A1* | 9/2008 | Lynch ................... G07F 17/329 463/25 |
| 2010/0144426 A1 | 6/2010 | Winner et al. |
| 2013/0143649 A1 | 6/2013 | Allen et al. |
| 2013/0169743 A1* | 7/2013 | Beauvais ................. H04N 7/15 348/14.08 |

(Continued)

OTHER PUBLICATIONS

Burch, "Yahoo Fantasy Launches Live Video Chat Feature, Allowing Friends to Draft Baseball Teams Together (Exclusive)", May 23, 2021.

(Continued)

*Primary Examiner* — Emmanuel L Moise
*Assistant Examiner* — Xiang Yu
(74) *Attorney, Agent, or Firm* — Foley & Lardner LLP

(57) ABSTRACT

Systems and methods for synchronizing event data structures in computer networks are disclosed. A system can receive, via a network from a first computing device corresponding to a first profile, a first network communication to generate a synchronized group identifying a second profile of a second computing device. The system can generate the synchronized group, and in response to receiving a second network communication from the second computing device, generate a data record including data record parameters specified in the second network communication. A data package to present a content item corresponding to the data record is generated in response to determining that the second profile is identified in the synchronized group, and a feed of the synchronized group is provided in response to corresponding network communications.

16 Claims, 14 Drawing Sheets

(56) References Cited

U.S. PATENT DOCUMENTS

| | | | |
|---|---|---|---|
| 2013/0268357 A1 | 10/2013 | Heath | |
| 2013/0311598 A1* | 11/2013 | Arrouye | G06Q 10/10 709/217 |
| 2015/0143422 A1 | 5/2015 | Moran et al. | |
| 2018/0190077 A1* | 7/2018 | Hall | G07F 17/3288 |
| 2019/0099653 A1 | 4/2019 | Wanke et al. | |
| 2021/0056750 A1 | 2/2021 | Rowley | |
| 2021/0065516 A1* | 3/2021 | Warren | G07F 17/3272 |
| 2022/0215723 A1 | 7/2022 | Koustas et al. | |
| 2022/0270432 A1 | 8/2022 | Mendell et al. | |
| 2022/0377427 A1 | 11/2022 | Montgomery et al. | |
| 2023/0034853 A1 | 2/2023 | Jovanovic et al. | |

OTHER PUBLICATIONS

Elliot R, "The time is now for the ultimate friend-to-friend betting experience", May 28, 2019.

Final Office Action on U.S. Appl. No. 17/971,050 dated Sep. 27, 2023.

Gontarz, "The most common features offered by sportsbook app", Jun. 2, 2021.

Innovecs Games, "Sports Betting Algorithms: Opportunities for Your Business to Increase Revenue", Feb. 2, 2021.

Landers, "Machine Learning Approaches to Competing in Fantasy Leagues for the NFL", May 28, 2018.

Milne, "10 Best Sports Apps (and What Makes Them Stand Out)", Aug. 18, 2021.

Newall, "Request-a-bet sports betting products indicate patterns of bettor preference and bookmaker profits", Sep. 8, 2020.

Non-Final Office Action on U.S. Appl. No. 17/971,050 dated Jan. 26, 2023.

Non-Final Office Action on U.S. Appl. No. 17/971,050 dated Jun. 6, 2023.

Restivo, "The Action Network: Follow Your Friends' Bets in Our Updated Mobile App", Sep. 23, 2021.

Rovell, "Draftkings Hopes Social Feed Will Spark Engagement & Interaction Among Bettors", Jul. 18, 2022.

Wood, "Group Betting: How Sky Bet Added A Social Dimension to Sports Betting", Jul. 30, 2018.

\* cited by examiner

SYSTEMS AND METHODS FOR SYNCHRONIZING EVENT DATA STRUCTURES IN COMPUTER NETWORKS

CROSS-REFERENCE TO RELATED APPLICATION

The present application is a continuation of and claims priority to and the benefit of U.S. patent application Ser. No. 17/971,050, titled "SYSTEMS AND METHODS FOR SYNCHRONIZING EVENT DATA STRUCTURES IN A SOCIAL MEDIA PLATFORM", filed on Oct. 21, 2022, the disclosure of which is hereby incorporated by reference in its entirety for all purposes.

BACKGROUND

Providing synchronized information is useful for computing environments including multiple computing systems. Information can be shared using different formats or protocols. It is challenging to provide synchronized information efficiently in computing systems with different types of computing devices.

SUMMARY

The systems and methods of this technical solution provide techniques for synchronized information sharing between multiple computing devices, which can provide additional notifications, alerts, or other content in connection with live events. Due to their real-time nature, it can be challenging to share up-to-date information about live events involving interactions from multiple computing devices. The systems and methods of this technical solution address these and other issues by providing synchronized groups, allowing multiple computing devices to interact with, and receive notifications related to, live events. The synchronized groups can be established and utilized to automatically modify different profiles based on the information shared in the synchronized group.

One aspect of the present disclosure relates to a method for establishing synchronized groups. The method can be performed by one or more processors coupled to a non-transitory memory. The method can include receiving, from a first client device associated with a first player profile, a request to create a synchronized group for sharing data corresponding to live events. The request can identify a second player profile. The method can include establishing, responsive to the request, the synchronized group. The synchronized group can identify the first player profile and the second player profile. The method can include generating, responsive to receiving a second request from a second client device associated with the second player profile, a data record including data record parameters. The data record can be associated with a conditional opportunity of a live event. The method can include generating, responsive to determining that the second player profile is identified in at least one synchronized group, a data package to present a content item corresponding to the data record in a feed of the synchronized group. The data package can include a subset of the data record parameters stored in association with the synchronized group. The method can include receiving, from the first client device, a third request to view the feed of the synchronized group. The method can include providing, to the first client device, the feed of the synchronized group including the content item generated based on the data package and including an identifier of the second player profile.

In some implementations, the third request to view the feed can be received after a change in the conditional opportunity occurs. In some implementations, the method can include generating an updated data package based on the change in the conditional opportunity. In some implementations, the method can include receiving, responsive to an interaction with the content item, a request to generate a second data record associated with the conditional opportunity of the live event based on the subset of the data record parameters. In some implementations, the method can include generating, responsive to the request, the second data record. In some implementations, the second data record can include second data record parameters. In some implementations, the method can include generating, responsive to determining that the first player profile is identified in the at least one synchronized group, a second data package including a subset of the second data record parameters generated based on the data record parameters.

In some implementations, the method can include identifying, responsive to the second request to generate the data record and responsive to determining that the second player profile is identified in the at least one synchronized group, a plurality of synchronized groups in which the second player profile is identified as a member. In some implementations, the method can include generating, for each of the plurality of synchronized groups, a respective data package including the subset of the data record parameters. In some implementations, generating the data package for the synchronized group can be responsive to determining that the synchronized group is authorized to include data records associated with the second player profile.

In some implementations, the method can include receiving, from the second client device, a request to authorize the synchronized group to include data records associated with the second player profile. In some implementations, the request to authorize the synchronized group to include data records associated with the second player profile can be used to identify the subset of the data record parameters. In some implementations, the method can include maintaining a data structure identifying a plurality of synchronized groups including the synchronized group. In some implementations, each of the plurality of synchronized groups can be associated with a respective set of player profile identifiers.

In some implementations, the method can include receiving a request to increment a first counter or a second counter of the data package in response to a corresponding interaction with the content item. In some implementations, the method can include updating the first counter or the second counter of the data package based on the request. In some implementations, the method can include monitoring the live event to identify a change in the conditional opportunity. In some implementations, the method can include updating the data record parameters of the data record responsive to the change in the conditional opportunity.

Another aspect of the present disclosure relates to a system configured for establishing synchronized groups. The system can include one or more processors coupled to a non-transitory memory. The system can receive, from a first client device associated with a first player profile, a request to create a synchronized group for sharing data corresponding to live events. The request can identify a second player profile. The system can establish, responsive to the request, the synchronized group. The synchronized group can identify the first player profile and the second player profile. The system can generate, responsive to receiving a second request from a second client device associated with the second player profile, a data record including data record parameters. The data record can be associated with a conditional opportunity of a live event. The system can generate, responsive to determining that the second player profile is identified in at least one synchronized group, a data package to present a content item corresponding to the data record in a feed of the synchronized group. The data package can include a subset of the data record parameters and stored in association with the synchronized group. The system can receive, from the first client device, a third request to view the feed of the synchronized group. The system can provide, to the first client device, the feed of the synchronized group including the content item generated based on the data package and including an identifier of the second player profile.

In some implementations, the third request to view the feed can be received after a change in the conditional opportunity occurs. In some implementations, the system can include generating an updated data package based on the change in the conditional opportunity. In some implementations, the system can receive, responsive to an interaction with the content item, a request to generate a second data record associated with the conditional opportunity of the live event based on the subset of the data record parameters. In some implementations, the system can generate, responsive to the request, the second data record. In some implementations, the second data record can include second data record parameters. In some implementations, the system can generate, responsive to determining that the first player profile is identified in the at least one synchronized group, a second data package including a subset of the second data record parameters generated based on the data record parameters.

In some implementations, the system can identify, responsive to the second request to generate the data record and responsive to determining that the second player profile is identified in the at least one synchronized group, a plurality of synchronized groups in which the second player profile is identified as a member. In some implementations, the system can generate, for each of the plurality of synchronized groups, a respective data package including the subset of the data record parameters. In some implementations, generating the data package for the synchronized group can be responsive to determining that the synchronized group is authorized to include data records associated with the second player profile.

In some implementations, the system can receive, from the second client device, a request to authorize the synchronized group to include data records associated with the second player profile. In some implementations, the request to authorize the synchronized group to include data records associated with the second player profile can be used to identify the subset of the data record parameters. In some implementations, the system can maintain a data structure identifying a plurality of synchronized groups including the synchronized group. In some implementations, each of the plurality of synchronized groups can be associated with a respective set of player profile identifiers.

In some implementations, the system can receive a request to increment a first counter or a second counter of the data package in response to a corresponding interaction with the content item. In some implementations, the system can update the first counter or the second counter of the data package based on the request. In some implementations, the system can monitor the live event to identify a change in the conditional opportunity. In some implementations, the system can update the data record parameters of the data record responsive to the change in the conditional opportunity.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for synchronizing event data structures using synchronized groups. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for synchronizing event data structures using synchronized groups.

A. Computing and Network Environment

Figure 1A:
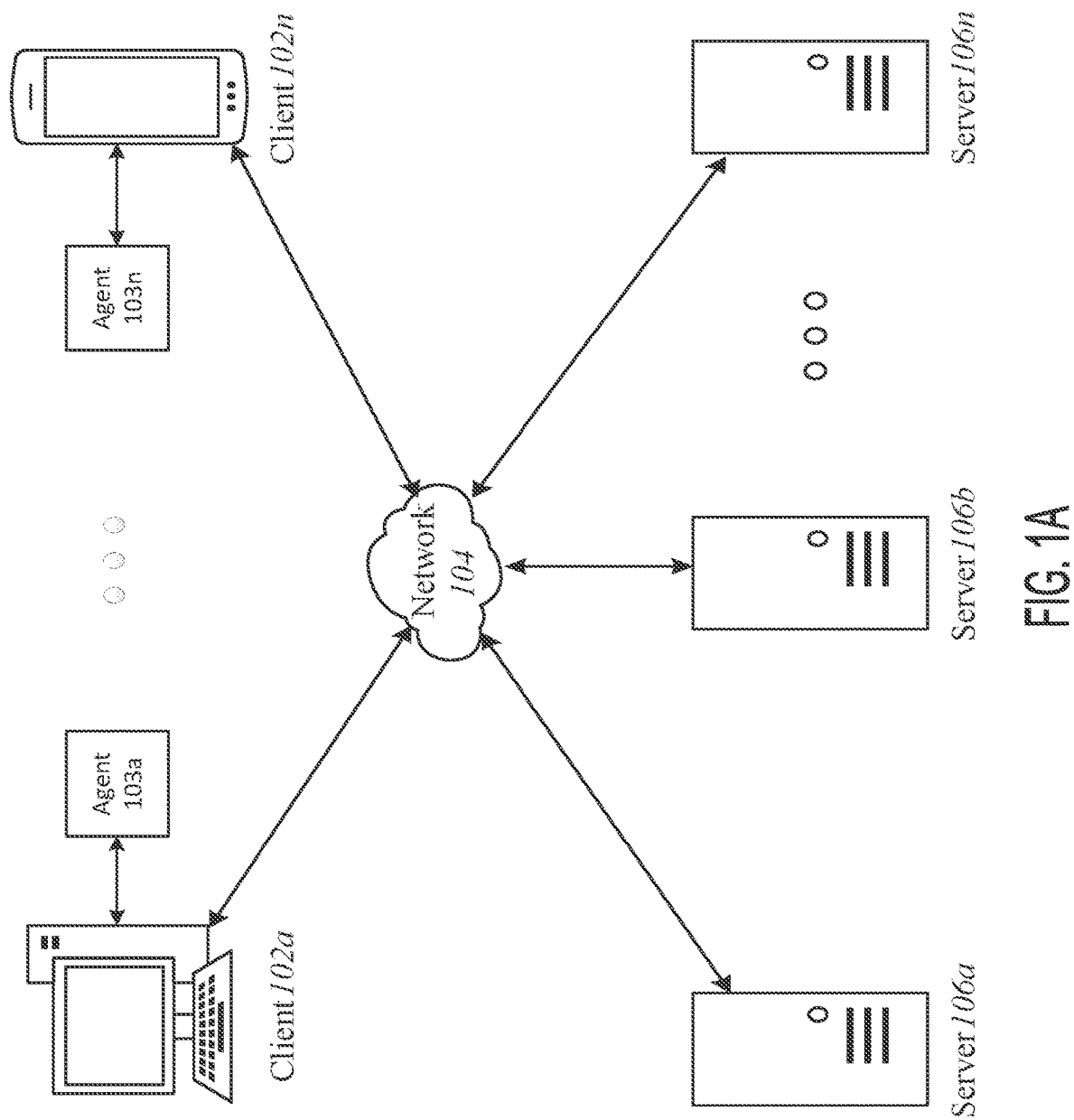
FIG. 1A is a block diagram depicting an embodiment of a network environment comprising a client device in communication with a server device.

Prior to discussing specific implementations of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
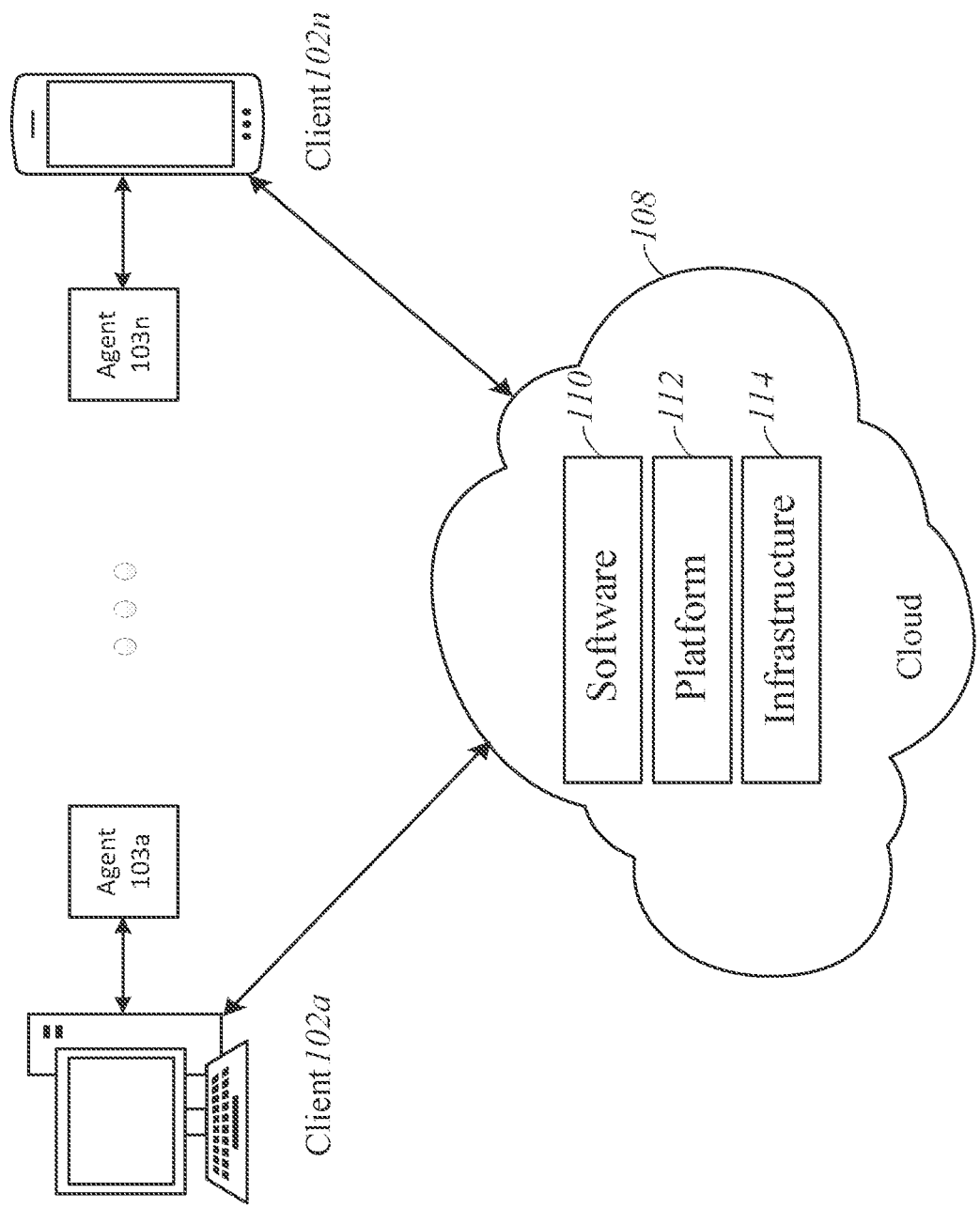
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
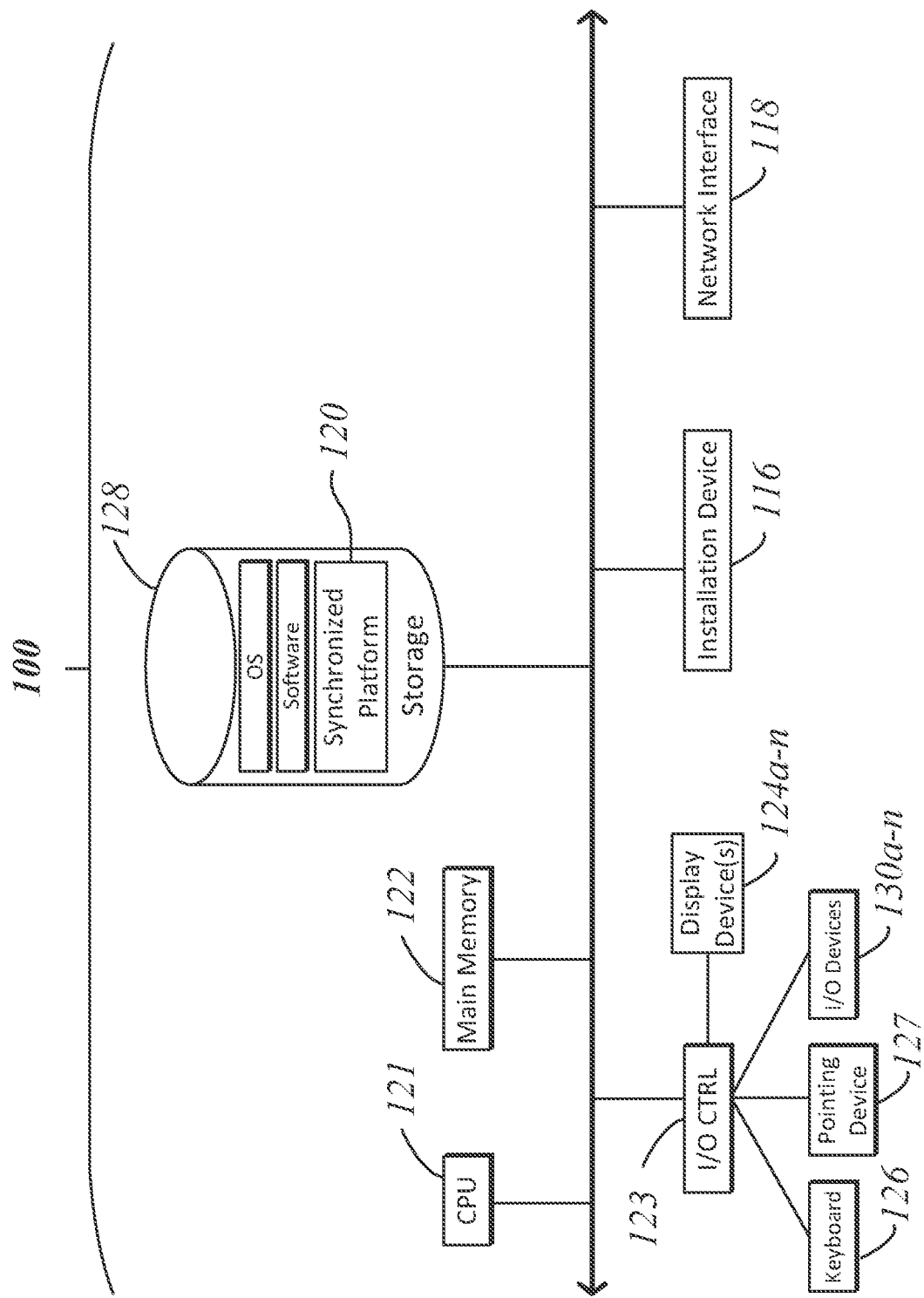
FIGS. 1C and 1D are block diagrams depicting embodiments of computing devices useful in connection with the methods and systems described herein.
Figure 1D:
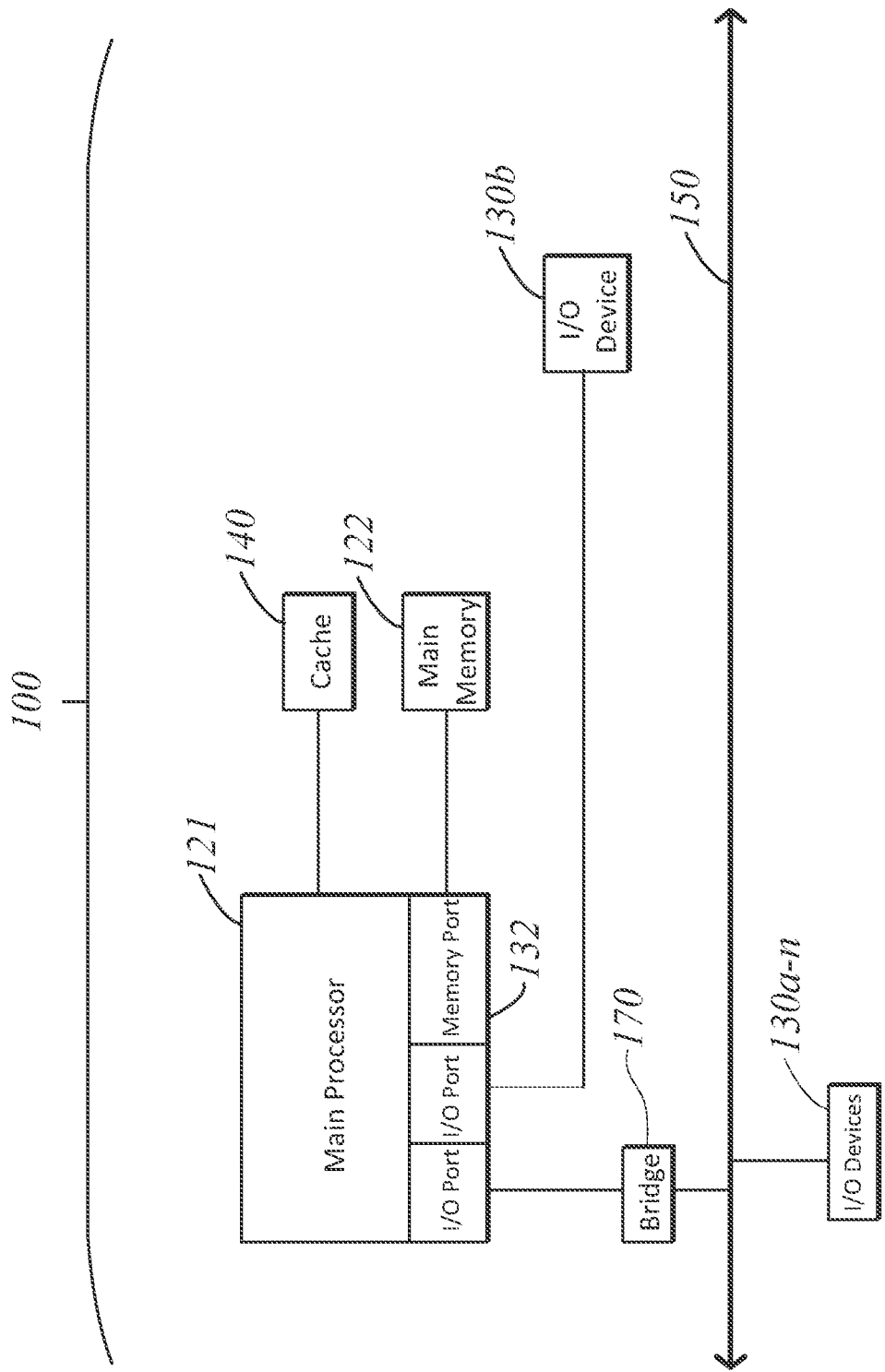

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus 150 while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now, or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102a-102n may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Synchronizing Event Data Structures Using Synchronized Groups

The systems and methods of this technical solution provide techniques for synchronizing event data structures using synchronized groups. To do so, synchronized groups identifying multiple player profiles can be generated and updated in accordance with data records that are generated by a data processing system. The present techniques can be utilized to enable the automatic synchronization of data records between two player profiles when those two player profiles are members of the same synchronized group. This can enable real-time (or near real-time) player profile updates without requiring additional input from multiple players. Therefore, the present techniques reduce overall network utilization when generating data records for multiple players.

The systems and methods described herein leverage cloud computing technology (e.g., a networked gaming environment, a cloud, video gaming devices, etc.) to synchronize event data structures using synchronized groups among various different types of computing devices, such as laptops, smart phones, personal computers, smart televisions, video gaming devices, or other such computing devices. The synchronized groups described herein can be utilized to synchronize data records or profile updates across different computing systems, profiles, and groups. When a data record is generated based on a player action, a call to a computing system can be made to determine that player is a member of any synchronized group. An endpoint can utilize an identifier of the requesting player to perform a lookup in a database to determine which the synchronized groups the player is a part of.

If player is a member of one or more synchronized groups, the system can generate additional data packages that are synchronized across those groups. The data packages can include an identifier of the action performed by the player, which can be used access history information or other information (e.g., odds info, current market data, etc.) about the player action or wager. The data package may be encoded (e.g., as a base64 string) and provided to the synchronized groups. The system can then display information relating to the player action based on the data package in a feed of the synchronized groups, and may also send notifications or alerts (e.g., a push notification) to other group members indicating the player action. Other players in the group may "tail" the data package (e.g., by performing the same player action or wager), and the synchronized group can maintain a number of the players in that group that performed the same action (e.g., placed the same wager). These and other features of data processing systems that generate synchronized groups are described in greater detail herein below.

Figure 2:
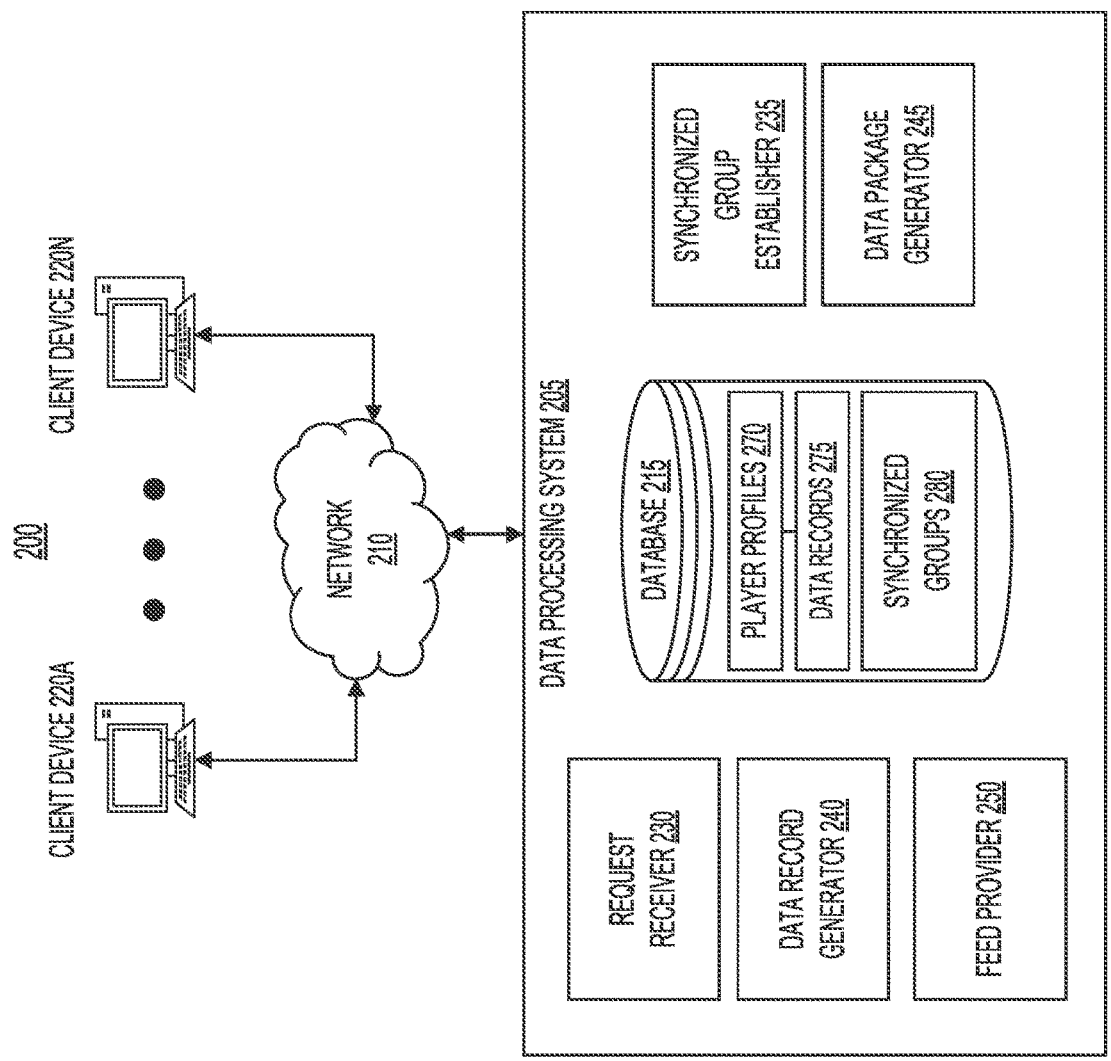
FIG. 2 is a block diagram of an example system for synchronizing event data structures using synchronized groups, in accordance with one or more implementations.

Referring now to FIG. 2, illustrated is a block diagram of an example system 200 for synchronizing event data structures using synchronized groups, in accordance with one or more implementations. The system 200 can include at least one data processing system 205, at least one network 210, and one or more client devices 220A-220N (sometimes generally referred to as client device(s) 220). The data processing system 205 can include a request receiver 230, a synchronized group establisher 235, a data record generator 240, a data package generator 245, a feed provider 250, and at least one database 215. The database 215 can include one or more player profiles 270, one or more data records 275 (sometimes generally referred to as the data record(s) 275), and one or more synchronized groups 280 (sometimes generally referred to as the synchronized group(s) 280 or "betting groups"). Although shown here as internal to the data processing system 205, the database 215 can be external to the data processing system 205, for example, as a part of a cloud computing system or an external computing device in communication with the devices (e.g., the data processing system 205, the client devices 220, etc.) of the system 200 via the network 210.

Each of the components (e.g., the data processing system 205, the network 210, the client devices 220, a data record generator 240, a data package generator 245, a feed provider 250, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the data processing system 205 can perform the functionalities detailed herein.

The data processing system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the computer system 100 described herein in conjunction with FIGS. 1A-1D.

In some implementations, the data processing system 205 may communicate with the client devices 220, for example, to provide user interfaces (e.g., the user interfaces described in connection with FIGS. 3A-3D, etc.) and to receive user input, via the network 210. In one example, the data processing system 205 can be or can include an application server or webserver, either of which may include software modules allowing various computing devices (e.g., the client devices 220, etc.) to access and/or manipulate data stored by the data processing system 205. For example, the data processing system 205 may comprise a webserver allowing the various computing devices to access data (e.g., via one or more web-based user interfaces, such as those described in connection with FIGS. 3A-3D) that is collected and manipulated by the data processing system 205. In this example, a player accessing the functionality of the data processing system 205 using a corresponding player profile 270 may execute a web browser application and access a website hosted on the webserver in order to access data (e.g., one or more feeds of a synchronized group 280 as described herein, etc.) generated or maintained by the data processing system 205.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for instance with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive or transmit data within the network 210.

The network 210 may further include any number of hardwired and/or wireless connections. Any or all of the computing devices described herein (e.g., the data processing system 205, the one or more client devices 220, the computer system 100, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various operations as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can be a personal computer, a laptop computer, a television device, a smart phone device, a mobile device, or another type of computing device. Each client device 220 can be implemented using hardware or a combination of software and hardware. Each client device 220 can include a display or display portion. The display can include a display portion of a television, a display portion of a computing device, a GUI, or another type of interactive display (e.g., a touchscreen, a display, etc.) and one or more I/O devices (e.g., a mouse, a keyboard, digital key pad). The display can include one or more portions, for example, to display user interfaces described in connection with FIGS. 3A-3D, which relate to the synchronized groups 280. The display can include a touch screen displaying an application, such as a web browser application or a native application which may be used to access the functionality of the data processing system 205 described herein.

The display may include a border region (e.g., side border, top border, bottom border). The display can include a touch screen display, which can receive interactions from a player. The client device 220 may also receive interactions via any other type of I/O device. The interactions can result in interaction data, which can be stored and transmitted by the processing circuitry of the client device 220. The interaction data can include, for example, interaction coordinates, an interaction type (e.g., drag, click, swipe, scroll, tap, etc.), and an indication of an actionable object (e.g., an interactive user interface element, such as a button, hyperlink, etc.) with which the interaction occurred. The interaction data can identify a user interface element (e.g., including any of the user interface elements described in connection with FIGS. 3A-3D) with which the interaction occurred.

Each client device 220 can include an input device that couples or communicates with the display of each client device 220 to enable a player to interact with or select one or more actionable objects as described herein. The display can enable interaction with one or more visual indications provided through the display of each client device 220, and responsive to an interaction (e.g., select, click-on, touch, hover), the client device 220 can generate an indication identifying a user input and/or selection of a wager, a live event, a content item in a feed of a synchronized group 280, an indication to establish or join a synchronized group 280, or an interaction to "tail" or "fade" a content item, among others.

Each client device 220 can include or be identified by a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some embodiments, each client device 220 can have a unique device identifier. Each client device 220 can include a client application, which can be a web browser or a native application that communicates with the data processing system 205 to establish or join a synchronized group 280, generate one or more data records corresponding to a live event (e.g., a post, a wager, etc.), or other functionality described herein. The client application can be executing on each client device 220, and may be provided to the client device 220 by the data processing system 205. The application can include a web application, a server application, a resource, a desktop, or a file.

The application can include a local application (e.g., local to a client device 220), hosted application, a SaaS application, a virtual application, a mobile application, or other forms of content. In some implementations, the application can include or correspond to applications provided by remote servers or third party servers. In some implementations, the application can access the player profiles 270, the data records 275, or the synchronized groups 280, stored and maintained in the database 215, and generate one or more interactive user interface elements, such as the interactive user interface elements described in connection with FIGS. 3A-3D, to a player when executed on a client device 220. The interactive user interface elements can include user-selectable hyperlinks, buttons, graphics, videos, images, or other application features. Interactions with such interactive user interface elements (sometimes referred to as "actionable objects") can cause the application executing on the respective client device 220 to generate a signal, which can cause the application to perform further operations corresponding to the actionable object.

In some implementations, one or more client devices 220 can establish one or more communication sessions with the data processing system 205. The one or more communication sessions can each include a channel or connection between the data processing system 205 and the one or more client devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data, or traffic.

In some implementations, in response to interactions with corresponding user interface elements, the application executing on a client device 220 can transmit information, such as player profile 270 information (e.g., changing player profile 270 parameters, changing login information, etc.), interaction information, selections of wager amounts, selections to establish a synchronized group 280, selections to join, view, or delete a synchronized group 280, selections to place a wager or authorize automatic population of wager information, or other signals to the data processing system 205. The client device 220 can transmit a request to establish a synchronized group 280. The request can include, for example, a request to create or join a synchronized group 280, as described herein. The request can include, for example, one or more identifiers of player profiles 270 that are invited to join the synchronized group 280. Additional requests may also be transmitted, including requests to generate one or more data records 275, as described herein. The requests can be hypertext transfer protocol (HTTP or HTTPS) request messages, file transfer protocol messages, email messages, text messages, or any other type of message that can be transmitted via the network 210.

As described herein, a client device 220 can receive one or more interactions with actionable objects presented on the display of the client device. Interactions can be tap interactions, click interactions, or other types of indications that a user is engaged with a particular user interface element. Upon detecting an interaction with a particular user interface element, the client device 220 can execute instructions (e.g., processor-readable code, a script, etc.) that cause the client device 220 to transmit an appropriate signal to the data processing system 205. Additionally, the client devices 220 may receive and display one or more feeds of content items, which may correspond to one or more synchronized groups 280, as described herein.

In some implementations, the application interfaces can generate a notification to join a synchronized group 280 in response to receiving a request to join a synchronized group 280 received from the data processing system 205. The notification can include an actionable object to accept or reject the invitation to join the viewing session. In response to an interaction with the actionable object indicating the player intends to join the viewing session, the application can transmit a message to the data processing system 205 indicating that the player intends to join the identified synchronized group 280. The message can include an identifier of the player profile 270 that accepted the invitation to join the synchronized group 280. In response to an interaction with the actionable object indicating the player has rejected the invitation, the application can transmit a message to the data processing system 205 indicating that the player does not intend to join the identified synchronized group 280.

The database 215 can be a computer-readable memory that can store or maintain any of the information described herein. The database 215 can store or maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the data processing system 205, or any other computing device described herein, via the network 210. In some implementations, the database 215 can be internal to the data processing system 205. In some implementations, the database 215 can exist external to the data processing system 205, and may be accessed via the network 210. The database 215 can be distributed across many different computer systems or storage elements, and may be accessed via the network 210 or a suitable computer bus interface. The data processing system 205 can store, in one or more regions of the memory of the data processing system 205, or in the database 215, the results of any or all computations, determinations, selections, identifications, generations, constructions, or calculations in one or more data structures indexed or identified with appropriate values.

Any or all values stored in the database 215 may be accessed by any computing device described herein, such as the data processing system 205, to perform any of the functionalities or functions described herein. In some implementations, a computing device, such as a client device 220, may utilize authentication information (e.g., username, password, email, etc.) to show that the client device 220 is authorized to access requested information in the database 215. The database 215 may include permission settings that indicate which users, devices, or profiles are authorized to access certain information stored in the database 215. The database 215 may be similar to or include the storage 128 described herein above in conjunction with FIG. 1C. In some implementations, instead of being internal to the data processing system 205, the database 215 can form a part of a cloud computing system. In such implementations, the database 215 can be a distributed storage medium in a cloud computing system and can be accessed by any of the components of the data processing system 205, by the one or more client devices 220 (e.g., via one or more user interfaces, etc.), or any other computing devices described herein.

The database 215 can store one or more player profiles 270 in one or more data structures. Each player profile 270 can be associated with a corresponding player (e.g., a user) of a client device 220 that accesses the functionality of the data processing system 205. In implementations where the data processing system 205 is itself a complete system that operates without using a client device 220 (e.g., a slot machine, a video game machine, etc.), a player profile 270 may correspond to a player that accesses the data processing system 205 to play games. Each player profile 270 can be a user profile that includes information about a user. Each player profile 270 may include information about one or more of the client devices 220 used to access the data processing system 205 using the player profile 270. For example, identifiers of a player profile 270 can be used to access the functionality of the data processing system 205 via the network 210.

The identifiers of player profiles 270 can include a username, a password, an e-mail address, a phone number, a personal identification number (PIN), a secret code-word, device identifiers for use in a two-factor authentication technique, among others. The player profile 270 can store information about historic wagers, data records 275, historic games viewed or wagered upon using the player profile 270, and historic live event outcomes, historic wagers (e.g., previously generated data records 275, etc.), previously accessed or joined synchronized groups 280, or other information. The player profile 270 can include a list of synchronized groups 280 that the player has joined. The player profile 270 can store a credit balance, wager information (e.g., an amount of a wager, a timestamp associated with a wager, information about the presence of an indication to participate in a bonus opportunity using the wager, a client device identifier of a client device that was used to place the wager, etc.).

The player profile 270 can store information about a client device 220 used to access the data processing system 205 such as an internet protocol (IP) address, a media access control (MAC) address, a global unique identification (GUID), a player profile 270 name (e.g., the name of a user of the client device 220, a player-chosen username, etc.), device name, among others. In some implementations, a player profile 270 can be created by the data processing system 205 in response to a player profile 270 creation request transmitted by a client device 220. The player profile 270 creation request can include any of the player profile 270 information described herein. In some implementations, a client device 220 accessing the data processing system 205 may not be associated with a player profile 270. In such implementations, the data processing system 205 can automatically create a player profile 270 using an identifier of the client device 220 provided by the client device 220.

The database 225 can store or maintain one or more data records 275 associated with each of the one or more player profiles 270 or one or more synchronized groups, for example, in one or more data structures. As described herein, when a player places a wager or transmits a request to modify their player profile 270, the client device 220 (or the application executing thereon) can transmit interaction data to the data processing system 205 via one or more messages in a communication session. The interaction data can include, for example, a time of the interaction, an identifier of a content item, an identifier of another data record 275, an identifier of a data package, an identifier of a synchronized group 280, an identifier of another player profile 270 associated with the content item, an identifier of another actionable object with which the player interacted, identifier(s) of a live event associated with the content item or other actionable object, identifiers of a type of action (e.g., place a wager, tail, fade, share, etc.) performed by the player via the interaction, values corresponding to any input information (e.g., wager amounts, authorization to automatically generate data packages or data records 275 that correspond to existing data records 275, etc.), a wager type (e.g., over/under, prop bet, etc.), or any other information relating to an interaction performed by a player at the client 220.

In some implementations, the client device 220 can transmit interaction data to the data processing system 205 in response to placing a wager via one or more application interfaces. The wager information in the interaction data can include, for example, any input information as part of the wager (e.g., wager amounts, etc.), the player profile 270 associated with the client device 220, a wager type (e.g., over/under, prop bet, etc.), an identifier of a live event corresponding to the wager, a wager identifier, a condition of a live event on which the wager was placed, or any other information relating to the wager. Upon receiving the interaction data, the data processing system 205 can store the interaction data as a data record 275, in association with the player profile 270 that was used to provide the interaction data. The data records 275 can be records of wagers, requests to modify a player profile 270, or any other data relating to live events that may be provided via an interaction at a client device 220. In some implementations, the data processing system 205 can store the data record 275 in association with one or more identifiers of a live event or a wagering opportunity of the live event identified in the interaction received from the client device 220.

The database 215 can store or maintain one or more synchronized groups 280 associated with one or more player profiles 270, for example, in one or more data structures. As described herein, the event processing system 205 can create one or more synchronized groups 280 in response to receiving a request from a client device 220 or a broadcast receiver device 220. A synchronized group 280 can be a data structure that identifies a number of player profiles 270 that are members the synchronized group 280. The synchronized group 280 can include information that can be accessed by and provided to each of the member player profiles. For example, each synchronized group 280 can include one or more feeds of content. The feeds can include a list of content items that may be sorted or arranged according to predetermined criteria (e.g., chronologically).

As members of a synchronized group 280, players can place wagers or perform other interactions as described herein using their player profiles 270. The wagers, interactions, or other information relating to the player profiles 270 that are members of the synchronized group 280 can be stored as one or more content items in a content feed of the synchronized group. Players can add and remove their player profiles 270 from the synchronized group 280 by transmitting one or more requests to join or leave the synchronized group 280. In some implementations, the synchronized group 280 can include one or more outcomes of wagers, live events, or player interactions (e.g., wagers, score tracking, etc.) associated with the content items in the content feed(s) of the synchronized group 280. The data processing system 205 can generate or update the synchronized groups 280 based on generated data packages, using the techniques described herein.

Referring now to the operations of the data processing system 205, the request receiver 230 can receive, from a client device 220 associated with a player profile 270, a request to create a synchronized group 280 for sharing data corresponding to live events. The request to create the synchronized group can be transmitted by a client device 220 via the application executing at the client device, and can identify one or more player profiles 270 (or other identifiers such as device identifiers, email addresses, phone numbers, or the like) as invitees. The request to establish the synchronized group 280 may include an interaction, such as a wager or a social media post that is to be included in the feed of the synchronized group 280 upon establishing the synchronized group 280.

Upon receiving the request to establish the synchronized group 280, the synchronized group establisher 235 can establish the synchronized group 280. The synchronized group 280 can identify the player profile 270 used to create the synchronized group and the player profiles 270 identified in the request as invitees. To do so, the synchronized group establisher 235 can identify the player profiles 270 invited to the synchronized group 280 and generate the synchronized group 280 by allocating (or identifying) a region of memory in the database 215 for the new synchronized group 280. If the player profile 270 is identified as a creator of the group, the synchronized group establisher 235 can store an association between the generated synchronized group 280 and the player profile 270. If the player profile 270 is identified as an invitee, the synchronized group establisher 235 can transmit a request to a client device 220 associated with the invited player profile 270. The request may include one or more interactive user interface elements that allow a player to indicate whether to accept or to decline the invitation to the synchronized group 280. If the client device 220 associated with the player profile 270 transmits an acceptance message to the data processing system 205, the synchronized group establisher 235 can store an association between the generated viewing session 280 and the player profile 270 of the invitee, identifying the player profile 270 as a member of the group 270. Similar messages can be transmitted by the client device 220 of a player profile 270 to remove the player profile 270 from the synchronized group 280.

In some implementations, client devices 220 can transmit a request to join a synchronized group 280. Certain synchronized groups 280 may be configured to allow players to join upon meeting certain criteria, such as using a login code (e.g., a private group), or may be open to any player profile 270 (e.g., a public group). For example, when the synchronized group establisher 235 generates a synchronized group 280, the synchronized group establisher 235 (or the client device 220 requesting creation of the synchronized group 280) can generate a login code (e.g., a PIN, a random number, a hash, etc.) that can be used when requesting to join the synchronized group 280. In some implementations, the login code can be transmitted as a content item to and displayed at the one or more client devices 220 identified as invitees. One or more players can then enter the login code into the client application, and the client device 220 can transmit a request to join a synchronized group 280 using the login code. In some implementations, the request can include a wager or another interaction corresponding to an identified live event, which may be posted as a content item in a feed of the synchronized group by the data processing system 205 using the techniques described herein.

The synchronized group establisher 235 can receive the requests to join the synchronized group 280 from the client devices 220 and store an association between the player profiles 270 of the client devices 220 and the synchronized group 280 (e.g., as members, etc.). In some implementations, the request receiver 230 can receive a request to leave a synchronized group 280 from a client device 280. The request can include, for example, an identifier of the synchronized group 280 to leave, and an identifier of the player profile 270 to remove from the synchronized group. In response, the request receiver 230 can delete the association between the synchronized group 280 and the player profile 270, thereby removing the player profile 270 from the synchronized group. Content that would otherwise be displayed when the player profile 270 was a participant in the synchronized group 280 is not displayed once the player profile 270 is removed from the synchronized group 280.

As described herein, a synchronized group 280 is a data structure that indicates an association between a group of players (e.g., identified by player profiles 270) that are viewing common broadcast content at one or more broadcast receiver devices 220. The synchronized group establisher 235 can store or update, in a player profile 270, a list of synchronized groups 280 indicating which synchronized groups 280 the player profile 270 is subscribed to or follows. Each synchronized group 280 can include a content feed, which can include a list of content items that are provided based on data packages generated using the techniques described herein. An example user interface that may be displayed at a client device 220 to access a content feed of a synchronized group is shown in FIG. 3A.

Figure 3A:
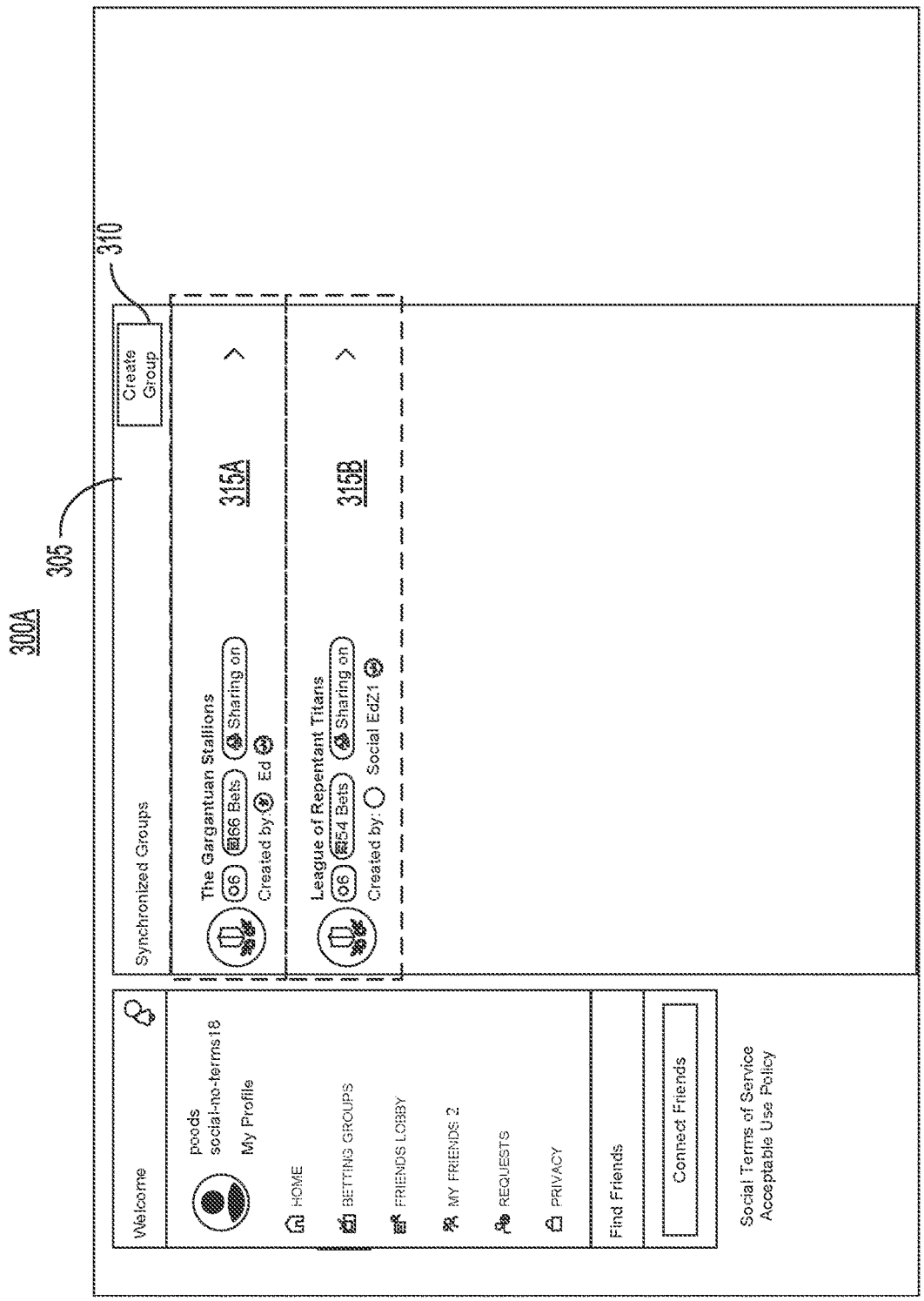
FIGS. 3A, 3B, 3C, and 3D illustrate example user interfaces that can be utilized to share information in synchronized groups, in accordance with one or more implementations.

Referring to FIG. 3A in the context of the components of FIG. 2, illustrated is an example user interface 300A, showing a list of synchronized groups 280 that a player accessing the data processing system 205 can access using a player profile 270. As shown, the user interface 300A includes a list 305 of synchronized groups 280. Each synchronized group 280 is shown as a respective content item, shown here as the content items 315A and 315B. Each content item can include information relating to the synchronized group 280, including an identifier (e.g., a name) of the synchronized group 280, an identifier of the player profile 270 used to create the synchronized group 280, an identifier of a number of player profiles 270 currently accessing the synchronized group 280 (or who are online and accessing the functionality of the data processing system 205), a number of data packages (e.g., bets) that have been generated as part of the synchronized group, as well as an indication showing whether data records 275 are automatically shared to the respective synchronized group 280. Each content item 315A or 315B can be an interactive content items, which when interacted with, cause the application presenting the user interface 300A to show a content feed of the selected synchronized group 280. The data processing system 205 can receive the request to view the synchronized group 280 and provide the content feed to the requesting client device 220 in a user interface, such as the user interface depicted in FIG. 3B.

Referring back to FIG. 2, upon a request from a client device 220 using a player profile 270 that is a member of synchronized group 280, the data record generator 240 can generate a data record 275 including data record parameters and associated with a conditional opportunity of a live event. The conditional opportunity can be a wagering opportunity, and the data record parameters can be parameters of the wager. Some non-limiting examples of data record parameters can include a wager amount, a wager type (e.g., over/under, prop bet, etc.), an identifier of the live event to which the wager corresponds, an identifier of the wager request, an identifier of the conditional opportunity of the live event on which the wager was placed, a time the wager was placed, or any other information relating to the wager. Generating the data record 275 can include allocating a corresponding region of memory in the database 215 to store the data record 275. The data processing system 205 can monitor the conditional event opportunity corresponding to the data record 275 and update the data record 275 upon detecting a corresponding change. For example, if the conditional opportunity has expired, or a condition of the live event has changed that satisfies the conditional opportunity, the data record 275 can be updated to reflect the status of the data record (e.g., a wager status). For example, the data record 275 can be updated to indicate that the conditional opportunity has expired, whether the wager corresponding to the data record 275 was won or lost, and an amount that was won or lost through completion of the wager.

In some implementations, a request to generate a data record 275 can be transmitted from a client device 220 upon an interaction with a content item displayed in a content feed of a synchronized group 280. As described herein, the content feed can include one or more content items that identify wagers placed by members of the synchronized group 280. The content items can include interactive user interface elements that, when interacted with, cause the client device 220 to request the generation of a data record 275 that corresponds to the content item. Upon receiving the request, the data record generator 240 can access the data record parameters associated with the content item and generate a data record 275 associated with the requesting player profile 270 having the same (or a user-selected subset of the same) data record parameters (e.g., the same conditional opportunity, the same wager type, etc.).

Figure 3B:
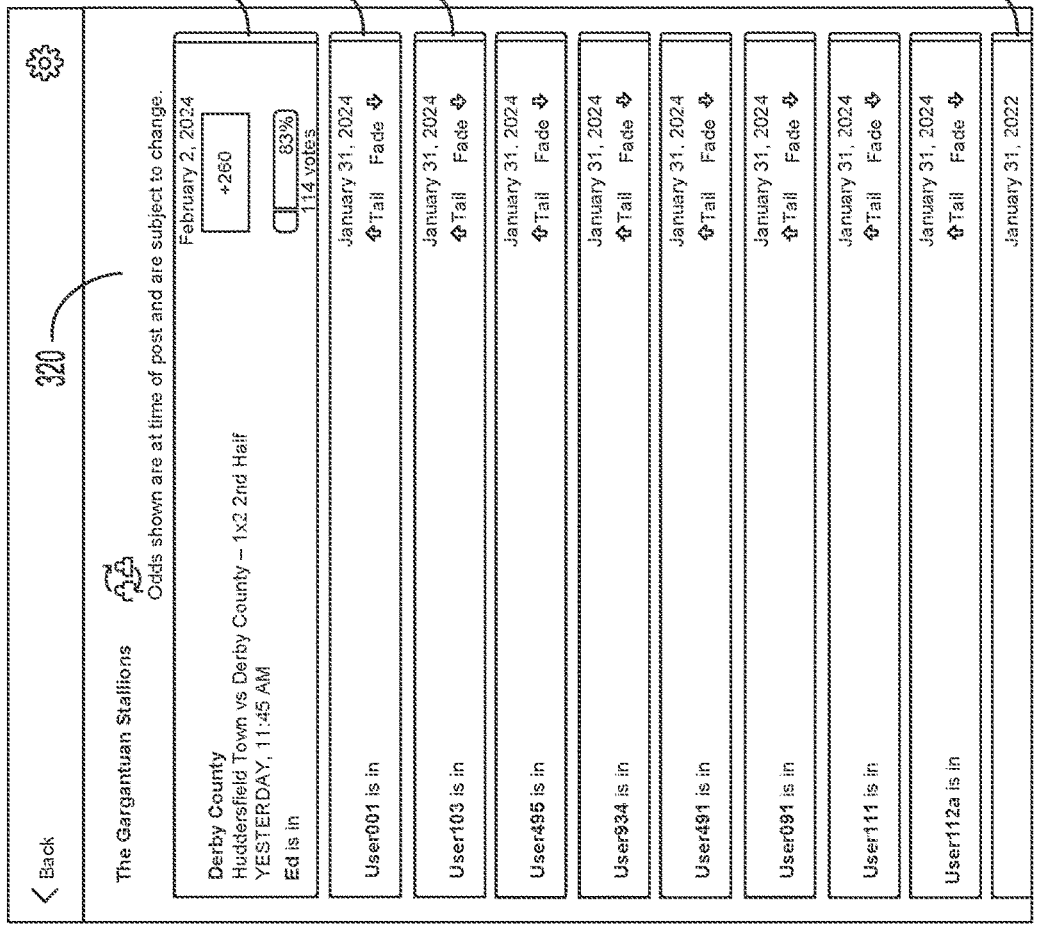
Figure 3B:
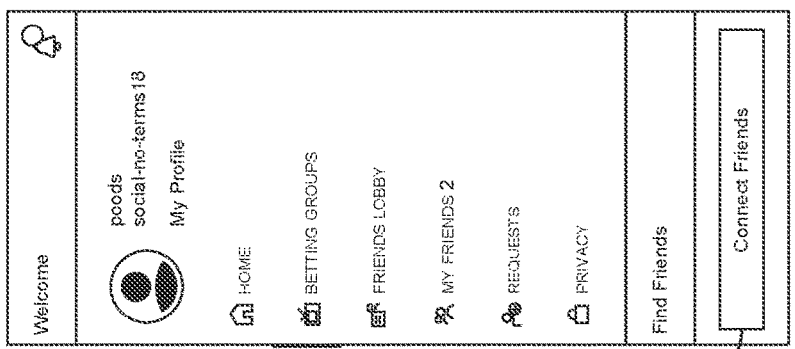
Figure 3C:

An example user interface displayed at a client device 220 following request and subsequent generation of a data record 275 is shown in FIG. 3C. Referring to FIG. 3 in the context of the components described in connection with FIG. 2, illustrated is an example user interface 300C that includes interactive elements enabling a player to place wagers (e.g., request generation of one or more data records 275). As shown, after a data record 275 is generated in response to a request, the data processing system 205 can transmit display instructions to the client device 220, causing display of the overlay 330. The overlay 330 shows the data record parameters (e.g., wager information such as odds, bet amount, etc.) of the one or more generated data records 275. Although data record parameters of only one data record 275 are shown in the overlay 330, it should be understood that the overlay 330 can display data record parameters from any number of data records 275, with the parameters of each data record 275 being displayed, for example, in a corresponding frame 335. Each frame 335 corresponding to a data record 275 can include an interactive element that allows a player to publish or share the data record 275 with one or more synchronized groups 280. In some implementations, the data processing system 205 may automatically publish or share the data record 275 with one or more synchronized groups 275 that are associated with corresponding permissions to do so in the player profile 270, by generating one or more data packages as described in greater detail herein.

Referring back to FIG. 2, the data package generator 245 can generate a data package to present a content item corresponding to a generated data record 275 in a feed of a synchronized group 280. The data package generator 245 can generate the data package, for example, responsive to the generation of a data record 275 and responsive to determining that the requesting player profile 270 is identified in at least one synchronized group 280. The data package can be derived from the data records 275 for use in sharing the betting information in a content item, while the data records 275 themselves can be utilized to monitor, process, and resolve the status of wagers. To generate the data package, the data package generator 245 can identify each of the synchronized groups 280 in which the requesting player profile 270 is identified as a member and can generate a corresponding data package for each synchronized group 280. In some implementations, preferences in the player profile 270 can indicate the synchronized groups 280 that are authorized for automatic sharing (e.g., automatic generation and sharing of data packages when a data record 275 is generated). Identifying the synchronized groups 280 can include accessing the list of the synchronized groups 280 in the player profile 270 (e.g., in some implementations, filtering those groups only to those for which automatic sharing is enabled) and extracting the identifiers of each synchronized group 280. In some implementations, the data package generator 245 can enumerate the lists of player profiles 270 identified in each synchronized group 280 in the database 215 and identify each synchronized group 280 that includes the requesting player profile 270 as a member.

The data package can include a subset of the data record parameters of the data record 275 that are suitable for sharing in a social media platform. To generate the data package, information such as the live event on which the wager was placed, the odds of the wager opportunity at the time the wager was placed, the time the wager was placed, an identifier of the player profile 270 that placed the wager, and information relating to the wager opportunity and type of wager, among others, can be extracted from the generated data record 275 and stored as part of the data package. The data package can be stored as a data structure, such as a JavaScript Object Notation (JSON) data structure. Additionally, an encoding procedure can be used to reduce the size of the data structure for insertion into a content item. Such encoding procedures can include, but are not limited to, base64 encoding, hexadecimal encoding, or the like. In some implementations, preferences in the player profile 270 can indicate which portions of generated data records 275 can be used to generate the data package. In some implementations, these preferences can be changed on the basis of each synchronized group 280. For example, the data processing system 205 may be authorized according to permissions in the player profile 270 as to what data should be included in data packages for each synchronized group 280 in which the player profile 270 is a member.

The various preferences in the player profile 270 that authorize the automatic generation of data packages for user-selected synchronized groups 280, and that authorize particular portions of data records 275 to be included in data packages generated for particular synchronized groups, can be modified using the client devices 220. For example, a player can access the functionality of the data processing system 205 (e.g., by logging in, etc.) using a corresponding player profile 270 and can transmit requests to modify the permissions of the player profile to enable or disable automatic generation of data packages for particular synchronized groups 280. In addition, requests can be transmitted to modify the permissions to set particular types of data that can be included in the data packages, which may be set on a per-group basis. The data processing system 205 can modify the permissions in the player profile 270 in accordance with the request.

Additionally, the player can use the client device 220 to manually request sharing of a data record 275 with one or more user-selected synchronized groups 280, and the data processing system 205 can generate corresponding data packages for those user-selected groups using the techniques described herein. Once generated, each data package can be stored in association with the synchronized group 280 for which it was generated. As described herein above, the data processing system 205 can monitor changes in various conditional opportunities (e.g., wager opportunities) for which data records 275 were generated and update the data records 275 upon detecting changes in the live event corresponding to the conditional opportunities, or upon detecting changes to the conditional opportunities. When an update to a data record 275 is generated, the data package generator 245 can generate corresponding data packages for each data record to replace each of the previously generated data packages for the data record 275. The updated data packages can be stored in association with the corresponding synchronized groups 280 and, in some implementations, may remove or replace the previously generated data packages.

Figure 3D:
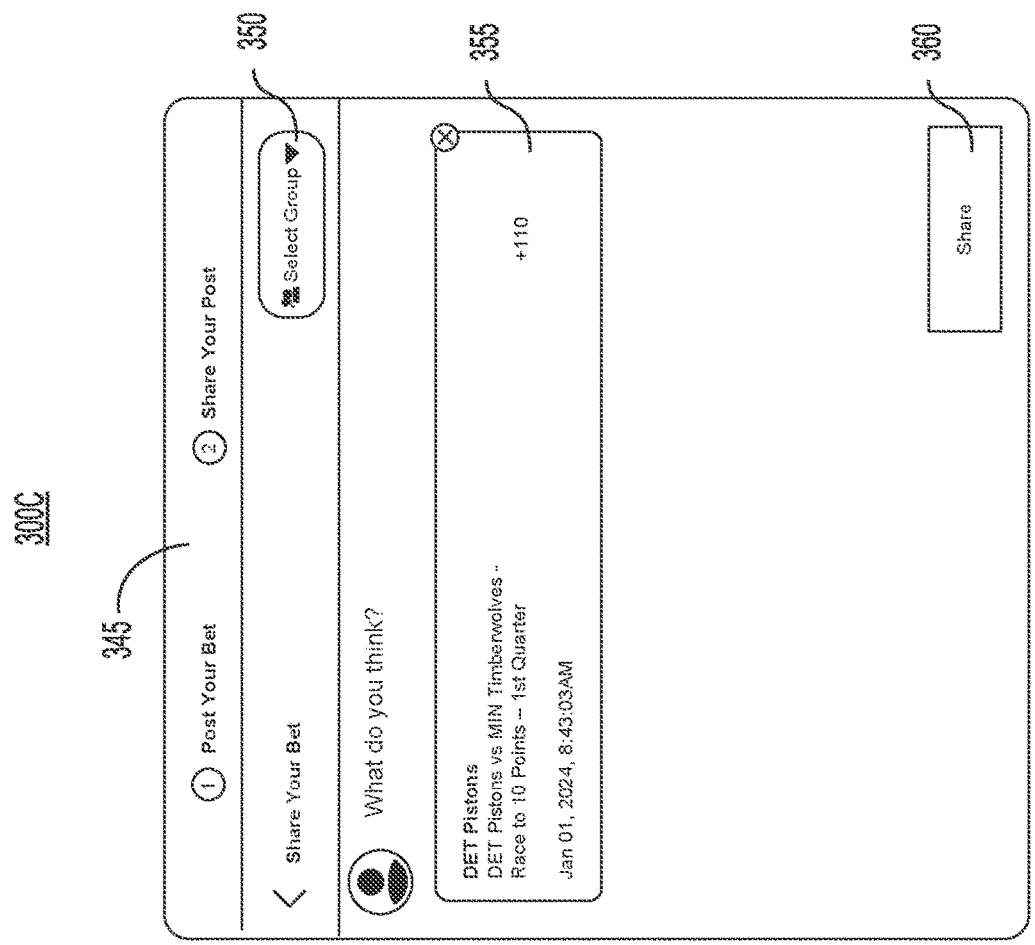

An example user interface showing a manual sharing process, in which a player can select with which synchronized groups 280 to share a particular data record 275, is shown in FIG. 3D. Referring to FIG. 3D in the context of the components described in connection with FIG. 2, illustrated is a user interface 300D showing an overlay 345 that may be displayed in a web-based browser or native application. The overlays of the various user interfaces described herein need not be overlays, and may be any type of frame, pop-up, notification, alert, or user interface container. As shown, the overlay 345 includes a drop-down menu 350 allowing for the selection of one or more synchronized groups 280 with which to share a data record 275. The data record parameters of the data record 275 to be shared are shown in the frame 355. The overlay 345 includes an interactive button 360, which, when interacted with, causes the client device 220 to transmit a request to generate a data package for the data record 275 for each of the selected synchronized groups 280.

Referring back to FIG. 2, the feed provider 250 can provide a feed of a synchronized group 280 in response to a request. The feed can include one or more content items, each corresponding to a respective data package (and therefore a respective data record and wager). Each content item can also include additional information from the data package, such as an identifier of the player profile 270 that requested generation of the corresponding data record 275 (e.g., the player profile 270 that was used to place a corresponding wager, etc.). In some implementations, the feed provider 250 can sort or update the feed of the synchronized group in real-time (or near real-time), for example, when additional data packages are generated for the synchronized group 280. Providing the feed of content items can include transmitting display instructions that cause the client device 220 to display the feed of the one or more content items. The display instructions may include JavaScript, hypertext markup language 5 (HTML5) data, or other types of display instructions. In some implementations, the display instructions can cause the client device 220 to generate and display the content items to include the information in the data packages generated by the data processing system 205. In another embodiment, the data processing system 205 generates the content items, and the display instructions cause the client device 220 to arrange the content items in the feed according to predetermined criteria (e.g., sorting in chronological order, ranked by priority or associations with other player profiles 270 that placed wagers in the synchronized groups, or other types of ranking policies).

An example user interface showing a feed of content of a synchronized group 280 is shown in FIG. 3B. Referring to FIG. 3B, illustrated is an example user interface 300B, which shows a feed 320 of one or more content items 325A-325N (sometimes generally referred to as the "content item(s) 325"). As shown, the feed 320 includes an identifier (e.g., a name) of the synchronized group 280. The user interface 300B may be displayed, for example, upon selection of a synchronized group 280 shown in the user interface 300A of FIG. 3A. Each content item 325 may be an interactive user interface element that has multiple states. For example, in an initial state, the content item may show a subset of the information in the corresponding data package. The content item 325B is an example of the content item in an initial state, which shows the identifier of the player profile 270 that placed the wager, and the time that the wager was placed. This information is provided as an example, but it should be understood that different or other information may also be displayed.

Upon interacting with a content item, the content item can transform into a second state, and display additional information from the corresponding data package. The content item 325A is an example of a content item in the second state. As shown, the content item in the second state shows additional information, such as a wager status (e.g., odds, whether the wager has expired or completed, a wager outcome, etc.), a number of votes corresponding to the number of players that have selected "tail" or "fade", a timestamp corresponding to the wager, and an identifier of the wager type and the conditional opportunity of a live event on which the wager was placed. Counters can be stored in association with each data package that track the number of players that select "tail" or "fade" in the corresponding content item in the feed 320. Selection of one of the "tail" or "fade" interactive elements can cause the client device 220 to transmit a request to update the corresponding counter of the data package.

Other or different information may also be displayed in the content items 325, as the information in the content item 325A is provided as a non-limiting example. Interacting with various content items 325 in the feed 320 can cause the content items to transition between states. The display instructions provided by the feed provider 250 can include instructions that cause the content items 325 to display the information (or subsets of information) in the data packages, and to transition between states as described herein. Additionally, the user interface 300B can include an interactive user interface element that allows a player to invite other player profiles 270 to join the established synchronized group 280 using techniques similar to those described herein.

Referring back to FIG. 2, the feed provider 250 can receive a request to increment one or more counters of the data package in response to a corresponding interaction with the content item. As described briefly above, each data package can be associated with a tail counter or a fade counter, which may indicate whether players generally approve of, or dislike, a particular wager, data package, or content item. Other (e.g., fewer, more, etc.) counters may also be possible for additional reactions or other types of player feedback. Upon receiving the request, the feed provider 250 can update the selected counter of the data package based on interaction data in the request. In some implementations, an interaction with a content item (e.g., or an interactive element thereof) can cause the client device 220 to transmit a request to automatically place a wager that includes the data record parameters of the data record to which the content item corresponds. In response, the data processing system 205 can generate a data record using the data record parameters as described herein.

Figure 4:
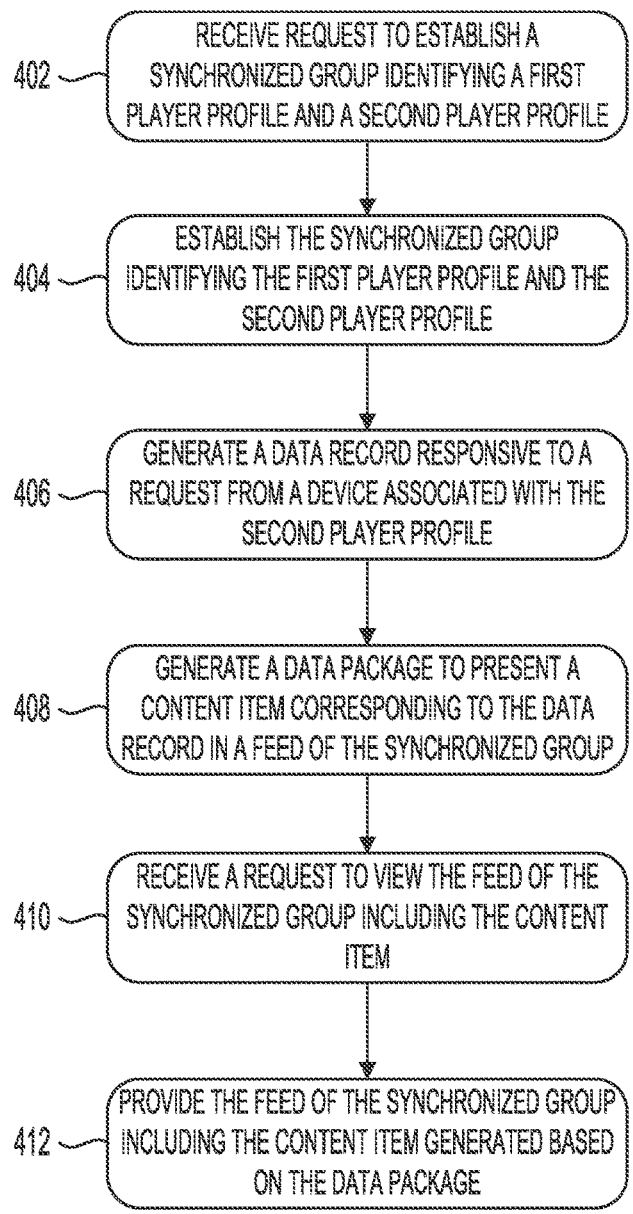
FIG. 4 illustrates an example flow diagram of a method for synchronizing event data structures using synchronized groups, in accordance with one or more implementations.

Referring now to FIG. 4, depicted is an illustrative flow diagram of a method 400 for synchronizing event data structures using synchronized groups. The method 400 can be executed, performed, or otherwise carried out by the data processing system 205, the computer system 100 described herein in conjunction with FIGS. 1A-1D, or any other computing devices described herein. In brief overview of the method 400, the data processing system (e.g., the data processing system 205, etc.) can receive a request to establish a synchronized group (STEP 402), establish the synchronized group (STEP 404), generate a data record in response to a second request (STEP 406), generate a data package to present a content item corresponding to the data record (STEP 408), receive a request to view a feed of the synchronized group (STEP 410), and provide the feed of the synchronized group (STEP 412).

In further detail of the method 400, the data processing system can receive a request to establish a synchronized group (e.g., the synchronized group 280) (STEP 402). The data processing system can receive, from a client device (e.g., a client device 220) associated with a player profile (e.g., the player profile 270), a request to create a synchronized group for sharing data corresponding to live events. The request to create the synchronized group can be transmitted by a client device via the application executing at the client device, and can identify one or more player profiles (or other identifiers such as device identifiers, email addresses, phone numbers, or the like) as invitees. The request to establish the synchronized group may include an interaction, such as a wager or a social media post that is to be included in the feed of the synchronized group upon establishing the synchronized group.

The data processing system can establish the synchronized group (STEP 404). Upon receiving the request to establish the synchronized group, the data processing system can establish the synchronized group. The synchronized group can identify the player profile used to create the synchronized group and the player profiles identified in the request as invitees. To do so, the data processing system can identify the player profiles invited to the synchronized group and generate the synchronized group by allocating (or identifying) a region of memory in a database (e.g., the database 215) for the new synchronized group. If the player profile is identified as a creator of the group, the data processing system can store an association between the generated synchronized group and the player profile. If the player profile is identified as an invitee, the data processing system can transmit a request to a client device associated with the invited player profile. The request may include one or more interactive user interface elements that allow a player to indicate whether to accept or to decline the invitation to the synchronized group. If the client device associated with the player profile transmits an acceptance message to the data processing system 205, the data processing system can store an association between the generated viewing session and the player profile of the invitee, identifying the player profile as a member of the group. Similar messages can be transmitted by the client device of a player profile to remove the player profile from the synchronized group.

In some implementations, client devices can transmit a request to join a synchronized group. Certain synchronized groups may be configured to allow players to join upon meeting certain criteria, such as using a login code (e.g., a private group), or may be open to any player profile (e.g., a public group). For example, when the data processing system generates a synchronized group, the data processing system (or the client device requesting creation of the synchronized group) can generate a login code (e.g., a PIN, a random number, a hash, etc.) that can be used when requesting to join the synchronized group. In some implementations, the login code can be transmitted as a content item to and displayed at the one or more client devices identified as invitees. One or more players can then enter the login code into the client application, and the client device can transmit a request to join a synchronized group using the login code. In some implementations, the request can include a wager or another interaction corresponding to an identified live event, which may be posted as a content item in a feed of the synchronized group by the data processing system 205 using the techniques described herein.

The data processing system can receive the requests to join the synchronized group from the client devices and store an association between the player profiles of the client devices and the synchronized group (e.g., as members, etc.). In some implementations, the request receiver 230 can receive a request to leave a synchronized group from a client device. The request can include, for example, an identifier of the synchronized group to leave, and an identifier of the player profile to remove from the synchronized group. In response, the request receiver 230 can delete the association between the synchronized group and the player profile, thereby removing the player profile from the synchronized group. Content that would otherwise be displayed when the player profile was a participant in the synchronized group are not displayed once the player profile is removed from the synchronized group.

As described herein, a synchronized group is a data structure that indicates an association between a group of players (e.g., identified by player profiles) that are viewing common broadcast content at one or more broadcast receiver devices. The data processing system can store or update, in a player profile, a list of synchronized groups indicating which synchronized groups the player profile is subscribed to or follows. Each synchronized group can include a content feed, which can include a list of content items that are provided based on data packages generated using the techniques described herein. An example user interface that may be displayed at a client device to access a content feed of a synchronized group is shown in FIG. 3A.

The data processing system can generate a data record (e.g., a data record 275) in response to a second request (STEP 406). Upon a request from a client device using a player profile that is a member of synchronized group, the data processing system can generate a data record including data record parameters and associated with a conditional opportunity of a live event. The conditional opportunity can be a wagering opportunity, and the data record parameters can be parameters of the wager. Some non-limiting examples of data record parameters can include a wager amount, a wager type (e.g., over/under, prop bet, etc.), an identifier of the live event to which the wager corresponds, an identifier of the wager request, an identifier of the conditional opportunity of the live event on which the wager was placed, a time the wager was placed, or any other information relating to the wager. Generating the data record can include allocating a corresponding region of memory in the database to store the data record. The data processing system can monitor the conditional event opportunity corresponding to the data record and update the data record upon detecting a corresponding change. For example, if the conditional opportunity has expired, or a condition of the live event has changed that satisfies the conditional opportunity, the data record can be updated to reflect the status of the data record (e.g., a wager status). For example, the data record can be updated to indicate that the conditional opportunity has expired, whether the wager corresponding to the data record was won or lost, and an amount that was won or lost through completion of the wager.

In some implementations, a request to generate a data record can be transmitted from a client device upon an interaction with a content item displayed in a content feed of a synchronized group. As described herein, the content feed can include one or more content items that identify wagers placed by members of the synchronized group. The content items can include interactive user interface elements that, when interacted with, cause the client device to request the generation of a data record that corresponds to the content item. Upon receiving the request, the data processing system can access the data record parameters associated with the content item and generate a data record associated with the requesting player profile having the same (or a user-selected subset of the same) data record parameters (e.g., the same conditional opportunity, the same wager type, etc.).

The data processing system can generate a data package to present a content item corresponding to the data record (STEP 408). The data processing system can generate a data package to present a content item corresponding to a generated data record in a feed of a synchronized group. The data processing system can generate the data package, for example, responsive to the generation of a data record and responsive to determining that the requesting player profile is identified in at least one synchronized group. The data package can be derived from the data records for use in sharing the betting information in a content item, while the data records themselves can be utilized to monitor, process, and resolve the status of wagers. To generate the data package, the data processing system can identify each of the synchronized groups in which the requesting player profile is identified as a member and can generate a corresponding data package for each synchronized group. In some implementations, preferences in the player profile can indicate the synchronized groups that are authorized for automatic sharing (e.g., automatic generation and sharing of data packages when a data record is generated). Identifying the synchronized groups can include accessing the list of the synchronized groups in the player profile (e.g., in some implementations, filtering those groups only to those for which automatic sharing is enabled) and extracting the identifiers of each synchronized group. In some implementations, the data processing system can enumerate the lists of player profiles identified in each synchronized group in the database and identify each synchronized group that includes the requesting player profile as a member.

The data package can include a subset of the data record parameters of the data record that are suitable for sharing in a social media platform. To generate the data package, information such as the live event on which the wager was placed, the odds of the wager opportunity at the time the wager was placed, the time the wager was placed, an identifier of the player profile that placed the wager, and information relating to the wager opportunity and type of wager, among others, can be extracted from the generated data record and stored as part of the data package. The data package can be stored as a data structure, such as a JSON data structure. Additionally, an encoding procedure can be used to reduce the size of the data structure for insertion into a content item. Such encoding procedures can include, but are not limited to, base64 encoding, hexadecimal encoding, or the like. In some implementations, preferences in the player profile can indicate which portions of generated data records can be used to generate the data package. In some implementations, these preferences can be changed on the basis of each synchronized group. For example, the data processing system may be authorized according to permissions in the player profile as to what data should be included in data packages for each synchronized group in which the player profile is a member.

The various preferences in the player profile that authorize the automatic generation of data packages for user-selected synchronized groups, and that authorize particular portions of data records to be included in data packages generated for particular synchronized groups, can be modified using the client devices. For example, a player can access the functionality of the data processing system (e.g., by logging in, etc.) using a corresponding player profile and can transmit requests to modify the permissions of the player profile to enable or disable automatic generation of data packages for particular synchronized groups. In addition, requests can be transmitted to modify the permissions to set particular types of data that can be included in the data packages, which may be set on a per-group basis. The data processing system can modify the permissions in the player profile in accordance with the request.

Additionally, the player can use the client device to manually request sharing of a data record with one or more user-selected synchronized groups, and the data processing system can generate corresponding data packages for those user-selected groups using the techniques described herein. Once generated, each data package can be stored in association with the synchronized group for which it was generated. As described herein above, the data processing system can monitor changes in various conditional opportunities (e.g., wager opportunities) for which data records were generated and update the data records upon detecting changes in the live event corresponding to the conditional opportunities, or upon detecting changes to the conditional opportunities. When an update to a data record is generated, the data processing system can generate corresponding data packages for each data record to replace each of the previously generated data packages for the data record. The updated data packages can be stored in association with the corresponding synchronized groups and, in some implementations, may remove or replace the previously generated data packages.

The data processing system can receive a request to view a feed of the synchronized group (STEP 410). The request can be transmitted by a client device that is accessing the data processing system using a corresponding player profile. The request can identify the synchronized group. The request can be transmitted in response to an interaction with an interactive user interface element displayed in a client application on a client device. For example, the request can be transmitted in response to an interaction with content displayed in a user interface, such as the user interface 300A of FIG. 3A.

Figure 5:
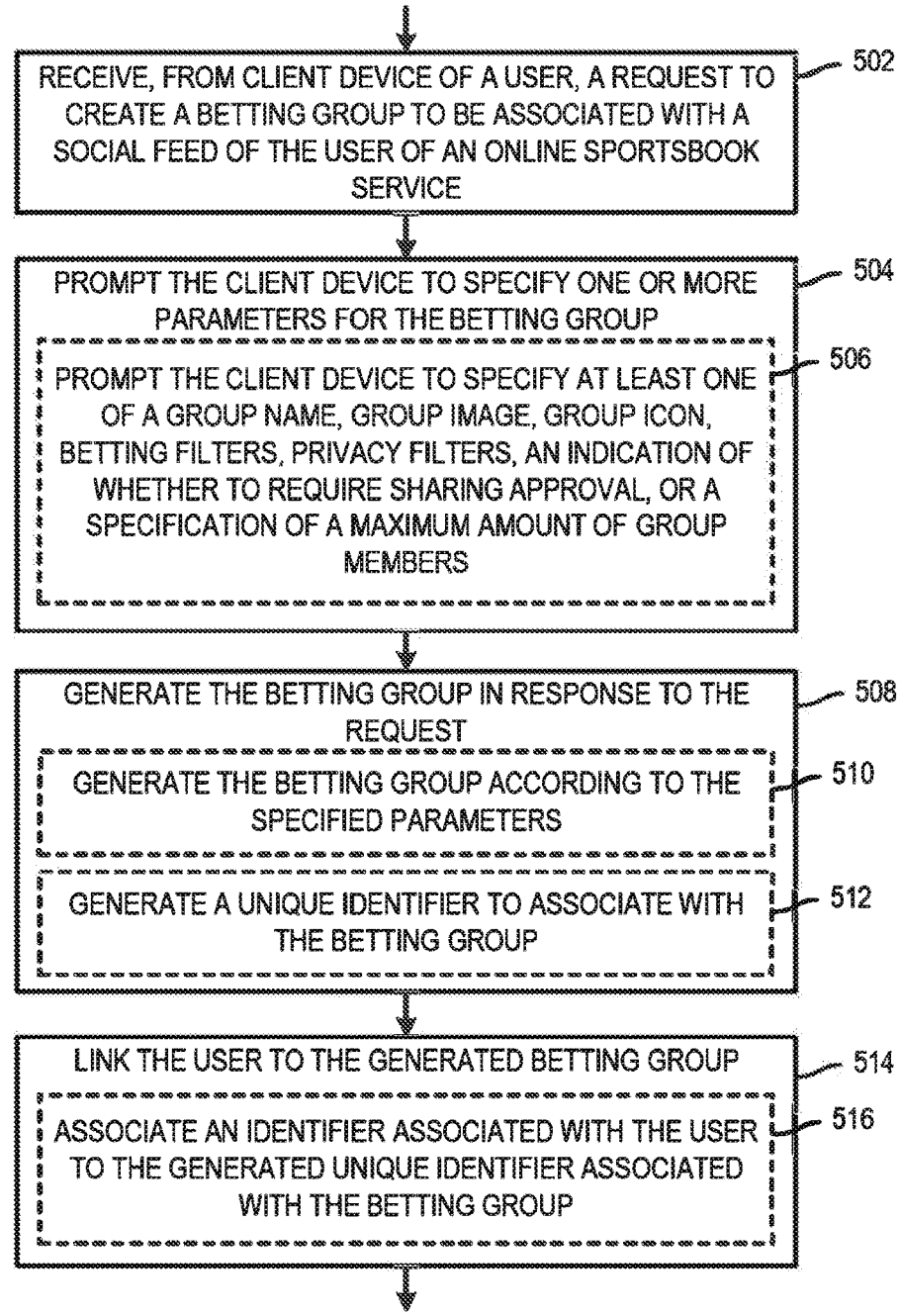
FIG. 5 illustrates an example flow diagram of a method for initializing a betting group, in accordance with one or more implementations.

FIG. 5 illustrates an example flow diagram of a method 500 for initializing a betting group, in accordance with one or more implementations. The method 500 can be executed, performed, or otherwise carried out by the data processing system 205, the computer system 100 described herein in conjunction with FIGS. 1A-1D, or any other computing devices described herein.

The data processing system (e.g., the data processing system 205) can receive, from a client device, a request to create a betting group to be associated with a social feed of the user of an online sportsbook service (STEP 502). The data processing can prompt the client device to specify one or more parameters for the betting group (STEP 504). The data processing system can prompt the client device to specify at least one of a group name, a group image, a group icon, betting filters, privacy filters, an indication of whether to require sharing approval, or a specification of a maximum amount of group members (STEP 506).

The data processing system can generate the betting group in response to the request (STEP 508). The data processing system can generate the betting group according to the specified parameters (STEP 510). The data processing system can generate a unique identifier to associate with the betting group (STEP 512). The data processing system can link the user to the generated betting group (STEP 514). The data processing system can associate an identifier associated with the user to the generated unique identifier associated with the betting group (STEP 516).

Figure 6:
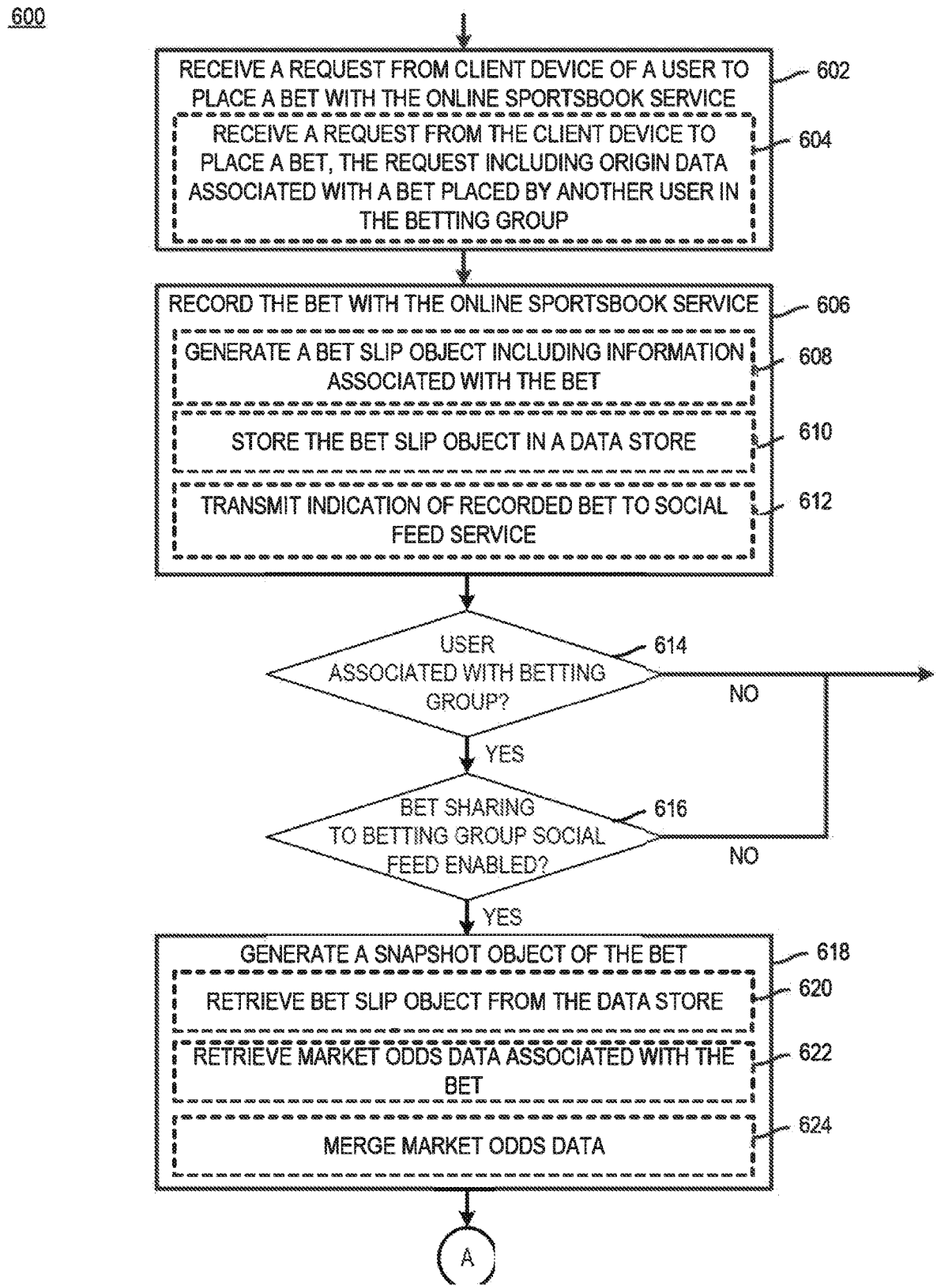
FIGS. 6 and 7 illustrate an example flow diagram of a method for placing a bet that can be shared with a betting group, in accordance with one or more implementations.
Figure 7:
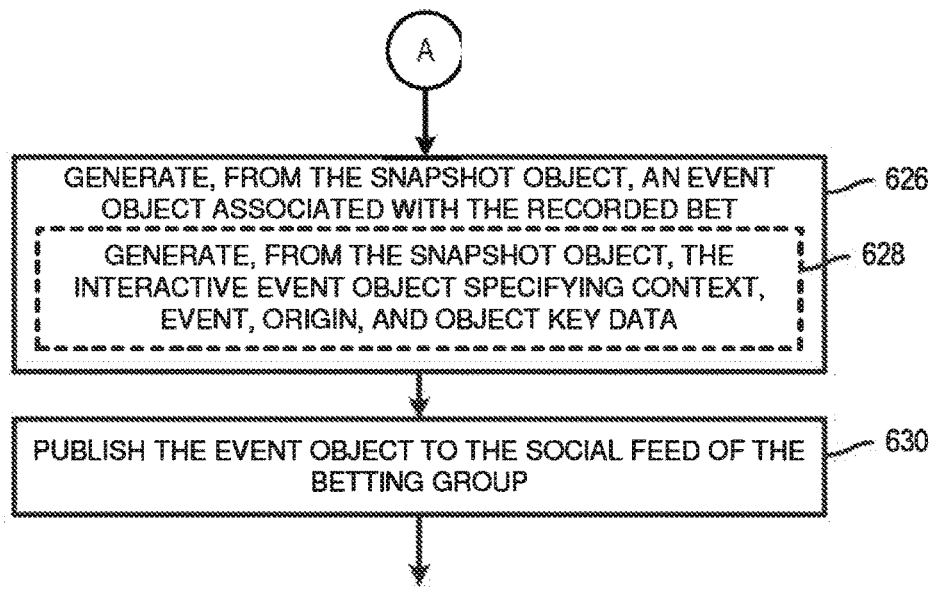

FIGS. 6 and 7 illustrate an example flow diagram of a method for placing a bet that can be shared with a betting group, in accordance with one or more implementations. The method 600 can be executed, performed, or otherwise carried out by the data processing system 205, the computer system 100 described herein in conjunction with FIGS. 1A-1D, or any other computing devices described herein.

The data processing system can receive a request from a client device of a user to place a bet with the online sportsbook service (STEP 602). The data processing system can receive a request to place a bet, the request including origin data associated with a bet placed by another user in the betting group (STEP 604). The data processing system can record the bet with the online sportsbook service (STEP 606). The data processing system can generate a bet slip object (e.g., a data record 275, a component of a data record 275, etc.) including information associated with the bet (STEP 608). The data processing system can store the bet slip object in a data store (STEP 610). The data processing system can transmit an indication of the recorded bet to a social feed service (STEP 612).

The data processing system can determine whether the user is associated with the betting group (STEP 614). If so, the data processing system can determine whether bet sharing of to the betting group social feed is enabled. (STEP 616). Otherwise, the data processing system can perform other operations. If bet sharing is enabled, the data processing system can generate a snapshot object of the bet (STEP 618). The data processing system can retrieve a bet slip object from the data store (STEP 620). The data processing system can retrieve market odds data associated with the bet (STEP 622). The data processing system can merge the market odds data with information from the bet slip into the snapshot object (e.g., the data package) (STEP 624). The data processing system can generate an event object (e.g., a content item) associated with the recorded bet from the snapshot object (STEP 626). The data processing system can generate the interactive event object specifying the context, live event, origin, and object key data of the snapshot object (STEP 628). The data processing system can publish the event object to the social feed of the betting group.

Figure 8:
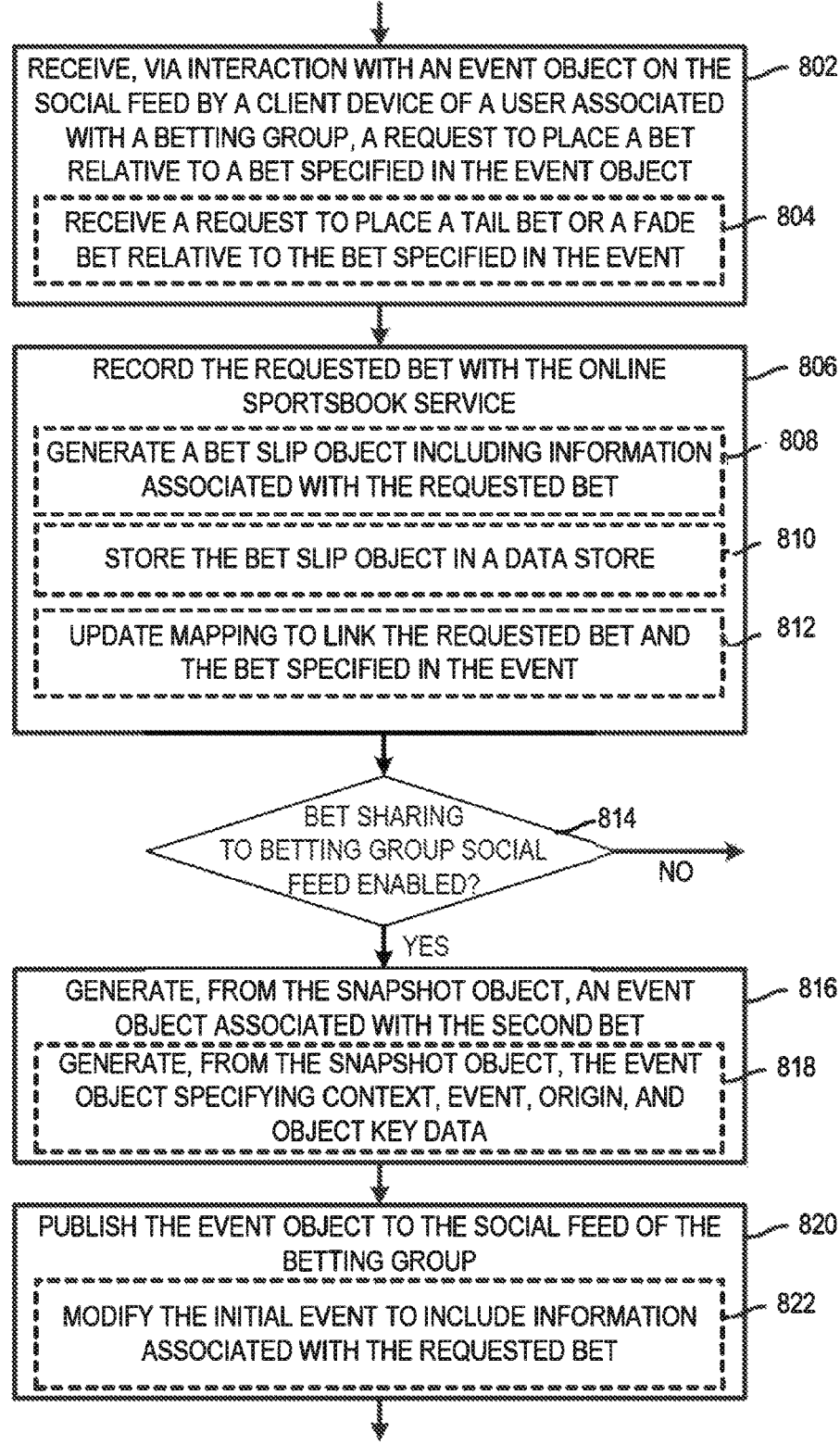
FIG. 8 illustrates an example flow diagram of a method for placing a bet based on a bet published in a betting group, in accordance with one or more implementations.

FIG. 8 illustrates an example flow diagram of a method for placing a bet based on a bet published in a betting group, in accordance with one or more implementations. The method 800 can be executed, performed, or otherwise carried out by the data processing system 205, the computer system 100 described herein in conjunction with FIGS. 1A-1D, or any other computing devices described herein.

The data processing system can receive, via an interaction with an event object on the social feed by a client device of a user associated with a betting group, a request to place a bet specified in the event object (STEP 802). The data processing system can receive a request to place a tail bet or a fade bet relative to the bet specified in the event (STEP 804). The data processing system can record the requested bet with the online sportsbook service (STEP 806). The data processing system can generate a bet slip object including information associated with the requested bet (STEP 808). The data processing system can store the bet slip object in a data store (STEP 810). The data processing system can update a mapping to link the requested bet and the bet specified in the event (STEP 812).

The data processing system can determine whether bet sharing to the betting group is enabled (STEP 814). If bet sharing is not enabled, the data processing system can perform other operations. If bet sharing is enabled, the data processing system can generate an event object (e.g., a content item) associated with the second bet from a snapshot object (e.g., the data packages described herein) (STEP 816). The data processing system can generate the event object specifying the context, the live event, the origin, and the object key data of the bet from the snapshot object (STEP 818). The data processing system can publish the event object to the social feed of the betting group (STEP 820). The data processing system can modify the initial event to include information associated with the requested bet (STEP 822).

The data processing system can provide the feed of the synchronized group (STEP 412). The data processing system can provide a feed of a synchronized group in response to a request. The feed can include one or more content items each corresponding to a respective data package (and therefore a respective data record and wager). Each content item can also include additional information from the data package, such as an identifier of the player profile that requested generation of the corresponding data record (e.g., the player profile that was used to place a corresponding wager, etc.). In some implementations, the data processing system can sort or update the feed of the synchronized group in real-time (or near real-time), for example, when additional data packages are generated for the synchronized group. Providing the feed of content items can include transmitting display instructions that cause the client device to display the feed of the one or more content items. The display instructions may include JavaScript, HTML5 data, or other types of display instructions. In some implementations, the display instructions can cause the client device to generate and display the content items to include the information in the data packages generated by the data processing system. In another embodiment, the data processing system generates the content items, and the display instructions cause the client device to arrange the content items in the feed according to predetermined criteria (e.g., sorting in chronological order, ranked by priority or associations with other player profiles that placed wagers in the synchronized groups, or other types of ranking policies).

The data processing system can receive a request to increment one or more counters of the data package in response to a corresponding interaction with the content item. As described briefly above, each data package can be associated with a tail counter or a fade counter, which may indicate whether players generally approve of, or dislike, a particular wager, data package, or content item. Other (e.g., fewer, more, etc.) counters may also be possible for additional reactions or other types of player feedback. Upon receiving the request, the data processing system can update the selected counter of the data package based on interaction data in the request. In some implementations, an interaction with a content item (e.g., or an interactive element thereof) can cause the client device to transmit a request to automatically place a wager that includes the data record parameters of the data record to which the content item corresponds. In response, the data processing system can generate a data record using the data record parameters as described herein.

Various aspects described herein may be implemented by the data processing system. The data processing system (e.g., the data processing system 205) or various computing systems described herein can perform, a variety of functionalities, including managing interactive betting group events of a social feed user interface. The data processing system can provide, to a first client device (e.g., a client device 220) of a first user of a plurality of users (e.g., players corresponding to player profiles 270) associated with a betting group (e.g., a synchronized group 280) for an online sportsbook service, a social feed (e.g., a feed of the synchronized group 280) comprising a plurality of events (e.g., data records 275) performed by various users or participants of live sporting events, contests, or broadcasts. Each event can be initiated by one of the plurality of users.

The data processing system can receive an indication of a first bet of the first user (e.g., a wager, an interaction, etc.). The first bet can be placed with the online sportsbook service via the first client device. The online sportsbook service may be implemented by the data processing system, or may be provided by another server or computing system that is in communication with the data processing system. The data processing system can determine, based on one or more parameters specified for the betting group, whether the betting group is configured to share bets of the first user (e.g., permissions as described herein) to the social feed. The data processing system can publish, upon determining that the betting group is configured to share bets of the first user to the social feed, an event including data associated with the first bet to the social feed.

The data processing system can receive an indication of a second bet of a second user of the plurality of users associated with the betting group. The second bet can have been placed with the online sportsbook service in response to an interaction with the published event on the social feed via a second device of the second user. The second bet can be based on the first bet. The data processing system can publish an event including data associated with the second bet to the social feed of the group. Publishing the event including the data associated with the second bet to the social feed can include modifying the event including data associated with the first bet to include the data associated with the second bet.

The data processing system can receive an indication of one of a tail bet or a fade bet of the second user relative to the first bet, for example, in the indication of the second bet. The data processing system can transmit a notification to the first client device of the published event including data associated with the second bet. The data processing system can generate a snapshot (e.g., a data package, as described herein) indicative of information associated with the first bet at the time that the first bet was placed upon determining that the betting group is configured to share bets of the first user to the social feed.

Generating the snapshot (e.g., the data package) can include retrieving, from a first data source of the online sportsbook service (e.g., the data records 275, which in some implementations may be stored by the data processing system or another computing system), data of at least one of a context of the first bet, a timestamp during which the first bet was placed, user profile information of the first user, or an outcome of the first bet. Generating the snapshot (e.g., the data package) can include retrieving, from a second data source (e.g., via another computing system, from odds data maintained by the data processing system, etc.), market odds data associated with the first bet at the time that the first bet was placed. Generating the snapshot (e.g., the data package) can include merging the data obtained from the first data source and the market odds data into the snapshot.

The data processing system can receive, from the first client device, a request to generate the betting group. The data processing system can prompting the first client device for a specification of at least one of a betting group name, a betting group image, a betting group icon, one or more betting filters, one or more privacy filters (e.g., permissions, invitees, public, private, etc.), or a maximum amount of members for the betting group. The data processing system can receive the specification from the first client device. The data processing system can generate the betting group (e.g., the synchronized group 280) according to the received specification.

Prompting the first client device for the specification of the one or more betting filters can include prompting the first client device for a selection of one or more sports or live event types to appear on the social feed. Prompting the first client device for the specification of the one or more privacy filters can include prompting the first client device for a specification of at least one of whether the betting group will be accessible to users outside of the betting group or whether the plurality of users associated with the betting group require approval from the first user to share bets with the group. The data processing system can enforce the various filters and privacy settings by publishing events, content, or other group-related information in the betting group that conform to the provided specification. Events, content, or other group-related information may not be published. In some implementations, the data processing system can provide an alert to a user that attempts to publish or share events, content, or other group-related information that do not conform to the specification.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for synchronizing event data structures using synchronized groups, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
one or more processors coupled to non-transitory memory, the one or more processors configured to:
  receive, via a network from a first computing device corresponding to a first profile, a first network communication to generate a synchronized group for synchronizing data via the network, the first network communication identifying a second profile of a second computing device;
  generate the synchronized group in response to the first network communication, the synchronized group identifying the first profile and indicating the second profile as an invitee;
  responsive to generating the synchronized group, transmit a second network communication to the second computing device associated with the second profile, the second network communication identifying an invitation to join the synchronized group;
  receive, from the second computing device responsive to the second network communication, a selection to accept the invitation to join the synchronized group;
  update the synchronized group to indicate that the second profile is a member of the synchronized group;
  in response to receiving a third network communication from the second computing device to place a wager, generate a data record for the wager comprising wager parameters specified in the third network communication;
  determine that the second profile comprises a permission setting to authorize automatic generation of a data package to present a content item corresponding to the data record in a feed of the synchronized group, wherein the permission setting, when enabled, authorizes the automatic generation of data packages for presenting, in the feed of the synchronized group, content items corresponding to data records for wagers associated with the second profile, and wherein the permission setting, when disabled, restricts the automatic generation of data packages for presenting, in the feed of the synchronized group, content items corresponding to data records for wagers associated with the second profile;
  in response to determining that the second profile is identified in the synchronized group and that the second profile comprises the permission setting to authorize automatic generation of data packages to present, in the feed of the synchronized group, content items corresponding to data records for wagers of the second profile, generate the data package to present a corresponding content item in the feed of the synchronized group, the data package comprising a subset of the wager parameters and stored in association with the synchronized group, the data package encoded according to an encoding format;
  receive, from the first computing device via the network, a fourth network communication to access data of the synchronized group via the network; and
  provide, to the first computing device via the network, the feed of the synchronized group, causing the first computing device to (i) decode the data package and (ii) generate the content item using the data package, the content item identifying the second profile.

2. The system of claim 1, wherein the one or more processors are further configured to:
detect a change in an event identified in the data record; and
generate an updated data package based on the change in the event.

3. The system of claim 1, wherein the one or more processors are further configured to:
receive, from the first computing device, a fifth network communication to generate a second data record based on the subset of the wager parameters;
generate, responsive to the fifth network communication, the second data record including second wager parameters generated based on the subset of the wager parameters; and
generate, responsive to determining that the first profile of the first computing device is identified in the synchronized group, a second data package comprising a second subset of the second wager parameters.

4. The system of claim 3, wherein the one or more processors are further configured to:
identify the subset of the wager parameters based on the fifth network communication.

5. The system of claim 1, wherein the one or more processors are further configured to:
identify, responsive to the third network communication and responsive to determining that the second profile is identified in the synchronized group, a plurality of synchronized groups in which the second profile is identified; and
generate, for each of the plurality of synchronized groups, a respective data package comprising the subset of the wager parameters.

6. The system of claim 1, wherein the one or more processors are further configured to:
maintain a data structure identifying a plurality of synchronized groups including the synchronized group, each of the plurality of synchronized groups identifying a respective set of profile identifiers.

7. The system of claim 1, wherein the one or more processors are further configured to:
receive a request to increment a first counter or a second counter of the data package in response to a corresponding interaction with the content item; and
update the first counter or the second counter of the data package based on the request.

8. The system of claim 1, wherein the one or more processors are further configured to:
detect a change in an event identified in the data record; and
update the wager parameters of the data record responsive to detecting the change in the event.

9. A method, comprising:
receiving, by one or more processors coupled to non-transitory memory, via a network from a first computing device corresponding to a first profile, a first network communication to generate a synchronized group for synchronizing data via the network, the first network communication identifying a second profile of a second computing device;
generating, by the one or more processors, the synchronized group in response to the first network communication, the synchronized group identifying the first profile and indicating the second profile as an invitee;
responsive to generating the synchronized group, transmitting, by the one or more processors, a second network communication to the second computing device associated with the second profile, the second network communication identifying an invitation to join the synchronized group;
receiving, by the one or more processors, from the second computing device responsive to the second network communication, a selection to accept the invitation to join the synchronized group;
updating, by the one or more processors, the synchronized group to indicate that the second profile is a member of the synchronized group;
receiving a third network communication from the second computing device to place a wager, generating, by the one or more processors, a data record for the wager comprising wager parameters specified in the second network communication;
determining, by the one or more processors, that the second profile comprises a permission setting to authorize automatic generation of a data package to present a content item corresponding to the data record in a feed of the synchronized group, wherein the permission setting, when enabled, authorizes the automatic generation of data packages for presenting, in the feed of the synchronized group, content items corresponding to data records for wagers associated with the second profile, and wherein the permission setting, when disabled, restricts the automatic generation of data packages for presenting, in the feed of the synchronized group, content items corresponding to data records for wagers associated with the second profile;
in response to determining that the second profile is identified in the synchronized group and that the second profile comprises the permission setting to authorize automatic generation of data packages to present, in the feed of the synchronized group, content items corresponding to data records for wagers of the second profile, generating, by the one or more processors, the data package to present a corresponding content item in the feed of the synchronized group, the data package comprising a subset of the wager parameters and stored in association with the synchronized group, the data package encoded according to an encoding format;
receiving, by the one or more processors, from the first computing device via the network, a fourth network communication to access data of the synchronized group via the network; and
providing, by the one or more processors, to the first computing device via the network, the feed of the synchronized group, causing the first computing device to (i) decode the data package and (ii) generate the content item using the data package, the content item identifying the second profile.

10. The method of claim 9, further comprising:
detecting, by the one or more processors, a change in an event identified in the data record; and
generating, by the one or more processors, an updated data package based on the change in the event.

11. The method of claim 9, further comprising:
receiving, by the one or more processors, from the first computing device, a fifth network communication to generate a second data record based on the subset of the wager parameters;
generating, by the one or more processors, responsive to the fifth network communication, the second data record including second wager parameters generated based on the subset of the wager parameters; and generating, by the one or more processors, responsive to determining that the first profile of the first computing device is identified in the synchronized group, a second data package comprising a second subset of the second wager parameters.

12. The method of claim 11, further comprising:

identifying, by the one or more processors, the subset of the wager parameters based on the fifth network communication.

13. The method of claim 9, further comprising:

identifying, by the one or more processors, responsive to the third network communication and responsive to determining that the second profile is identified in the synchronized group, a plurality of synchronized groups in which the second profile is identified; and generating, by the one or more processors, for each of the plurality of synchronized groups, a respective data package comprising the subset of the wager parameters.

14. The method of claim 9, further comprising:

maintaining, by the one or more processors, a data structure identifying a plurality of synchronized groups including the synchronized group, each of the plurality of synchronized groups identifying a respective set of profile identifiers.

15. The method of claim 9, further comprising:

receiving, by the one or more processors, a request to increment a first counter or a second counter of the data package in response to a corresponding interaction with the content item; and updating, by the one or more processors, the first counter or the second counter of the data package based on the request.

16. The method of claim 9, further comprising:

detecting, by the one or more processors, a change in an event identified in the data record; and updating, by the one or more processors, the wager parameters of the data record responsive to detecting the change in the event.

* * * * *